(12) United States Patent
DeGray

(10) Patent No.: US 10,399,631 B2
(45) Date of Patent: *Sep. 3, 2019

(54) INTEGRATED CYCLING TOOL

(71) Applicant: Evan J. DeGray, Park City, UT (US)

(72) Inventor: Evan J. DeGray, Park City, UT (US)

(*) Notice: Subject to any disclaimer, the term of this patent is extended or adjusted under 35 U.S.C. 154(b) by 0 days.

This patent is subject to a terminal disclaimer.

(21) Appl. No.: 15/582,211

(22) Filed: Apr. 28, 2017

(65) Prior Publication Data

US 2017/0233027 A1    Aug. 17, 2017

Related U.S. Application Data

(63) Continuation-in-part of application No. 15/448,390, filed on Mar. 2, 2017, which is a continuation of
(Continued)

(51) Int. Cl.

| | |
|---|---|
| *B25G 1/08* | (2006.01) |
| *B62K 19/40* | (2006.01) |
| *B62K 19/32* | (2006.01) |
| *B62K 21/18* | (2006.01) |
| *B62J 9/02* | (2006.01) |

(52) U.S. Cl.
CPC .............. *B62K 19/40* (2013.01); *B25G 1/085* (2013.01); *B62J 9/02* (2013.01); *B62K 19/32* (2013.01); *B62K 21/18* (2013.01)

(58) Field of Classification Search
CPC ......... B62K 19/40; B62K 21/18; B25G 1/085
See application file for complete search history.

(56) References Cited

U.S. PATENT DOCUMENTS 3,683,984 A * 8/1972 Hull ...................... B25G 1/085
                                                                81/177.4
5,328,194 A   7/1994 Buckler
(Continued)

FOREIGN PATENT DOCUMENTS

| CN | 201120940 Y | 9/2008 |
|---|---|---|
| DE | 4420170 A1 | 12/1995 |

(Continued)

OTHER PUBLICATIONS

Brompton, Brompton Toolkit is now available, http://brompton.com/news/16415/brompton-toolkit-is-now-available, Dec. 3, 2012 (2 pp.).

(Continued)

*Primary Examiner* — Joseph M Rocca
*Assistant Examiner* — Michael R Stabley
(74) *Attorney, Agent, or Firm* — Thorpe North and Western LLP

(57) ABSTRACT

The systems and methods described herein relate to cycling. More specifically, the systems and methods described herein relate to an integrated cycling tool. The cycling tool may be integrated into the bicycle components to reduce the external modifications to a bicycle. This may enable a cyclist to carry a tool with them without the worry of carrying the tool, or the tool falling off the bicycle. The cycling tool may comprise multiple components and may be used to fix various parts of a bicycle. The cycling tool may fit within the confines of the bicycle and provide minimal to no impact to the rider or the functionality and performance of the bicycle.

14 Claims, 21 Drawing Sheets

Related U.S. Application Data application No. 14/657,471, filed on Mar. 13, 2015, now Pat. No. 9,656,716.

(56) References Cited

U.S. PATENT DOCUMENTS

| | | | |
|---|---|---|---|
| 5,357,643 A | 10/1994 | Seals | |
| 5,918,513 A * | 7/1999 | Ho | B25G 1/085 81/177.4 |
| 5,950,498 A | 9/1999 | Gossett et al. | |
| 6,070,897 A | 6/2000 | Hsieh et al. | |
| 6,272,708 B1 * | 8/2001 | Chen | B25G 1/04 15/236.01 |
| 6,378,815 B1 * | 4/2002 | Lee | B62J 7/06 224/420 |
| 6,520,054 B1 | 2/2003 | Wang | |
| 6,530,098 B1 * | 3/2003 | Gringer | B25B 15/00 7/105 |
| 6,564,982 B1 | 5/2003 | Woods et al. | |
| 7,396,032 B2 | 7/2008 | Horiuchi | |
| 7,566,065 B2 | 7/2009 | Fukui | |
| 7,950,311 B2 * | 5/2011 | Chen | B25G 1/085 81/177.4 |
| 7,988,175 B2 | 8/2011 | White | |
| 8,066,296 B2 | 11/2011 | White | |
| 8,308,179 B2 | 11/2012 | Cote et al. | |
| 8,727,368 B1 | 5/2014 | Wrobleski | |
| 8,757,413 B1 | 6/2014 | Kephart | |
| 2005/0242140 A1 | 11/2005 | Yong et al. | |
| 2010/0257973 A1 | 10/2010 | White | |
| 2011/0121044 A1 | 5/2011 | Schopf | |
| 2012/0000313 A1 | 1/2012 | Zacks | |
| 2013/0032001 A1 | 2/2013 | Smart | |

FOREIGN PATENT DOCUMENTS

| | | |
|---|---|---|
| EP | 2159005 A1 | 3/2010 |
| EP | 2426040 A1 | 3/2012 |
| FR | 923490 | 7/1947 |
| FR | 1001399 | 2/1952 |
| GB | 700931 | 12/1953 |

OTHER PUBLICATIONS gizmag.com, Incog bike multi-tool stores in your handlebars, http://www.gizmag.com/incog-bike-tool-handlebars/22812/, Jun. 5, 2012 (6 pp.).

McRae, C., EDC—OneUp's Slick Hidden Tool, nsmb, https://nsmb.com/articles/edc-oneups-slick-hidden-tool/, Apr. 24, 2017 (23 pp.).

EDC Tool—OneUp Components US, 2017 (2 pp.).

* cited by examiner

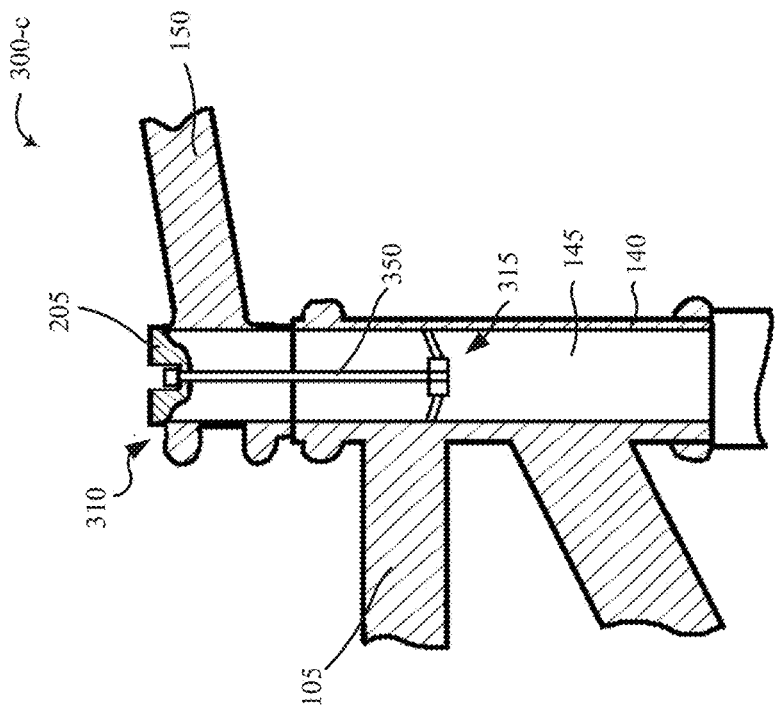
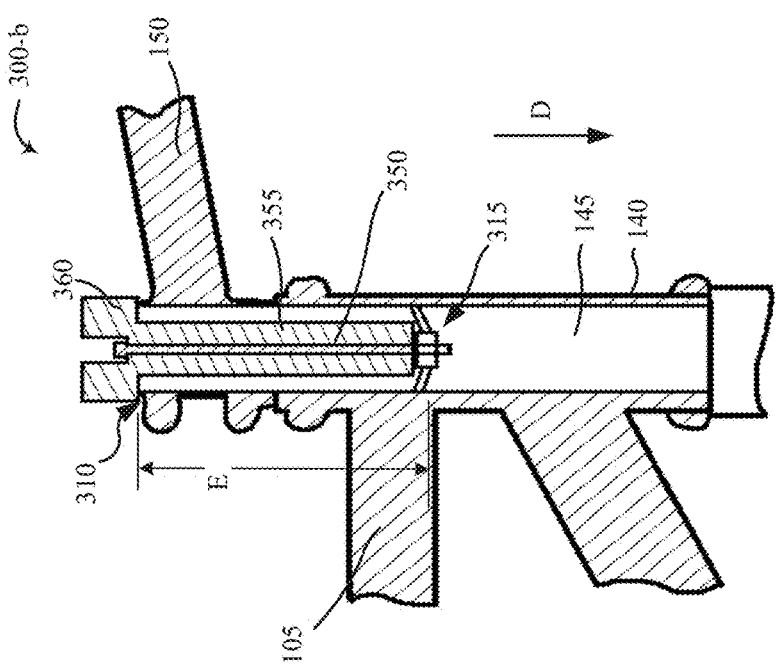
FIG. 3D
FIG. 3C

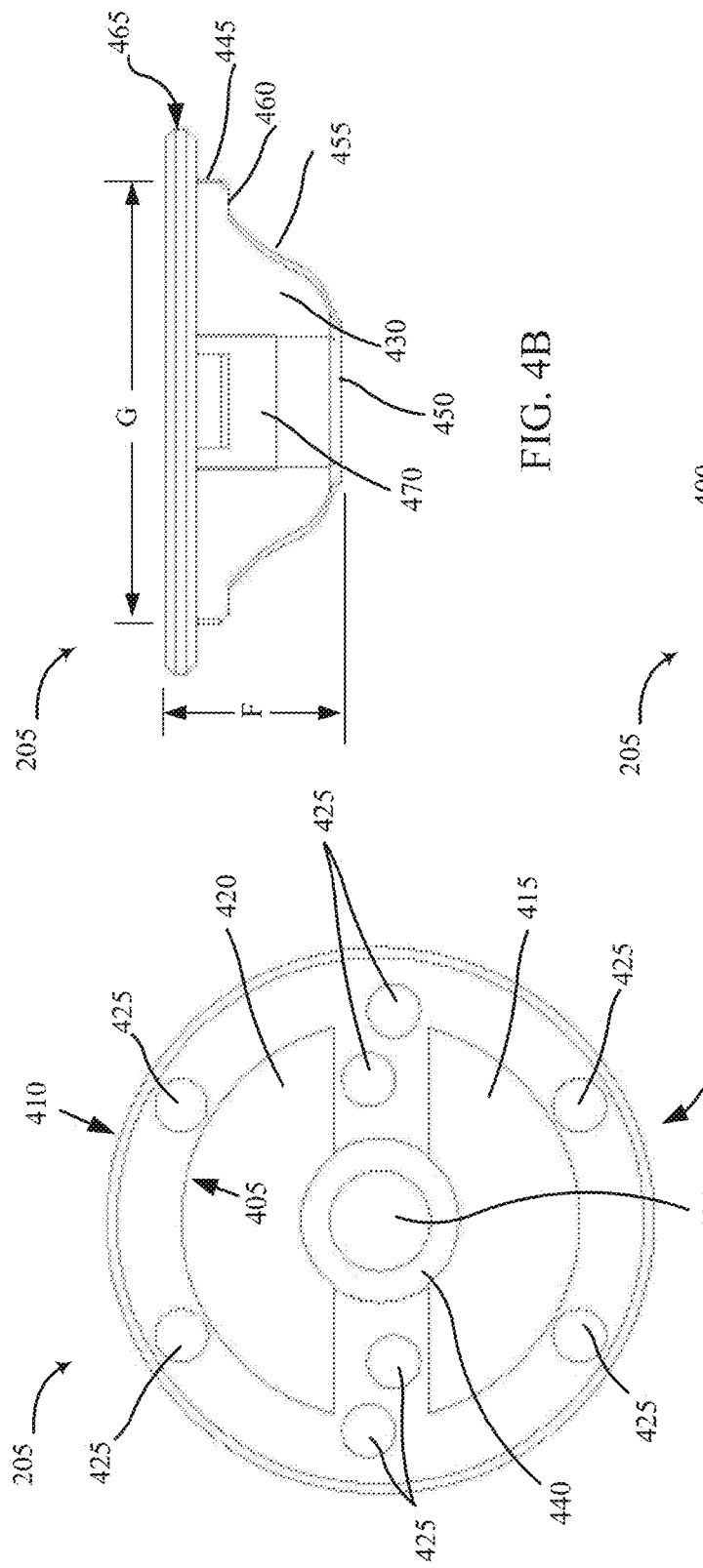
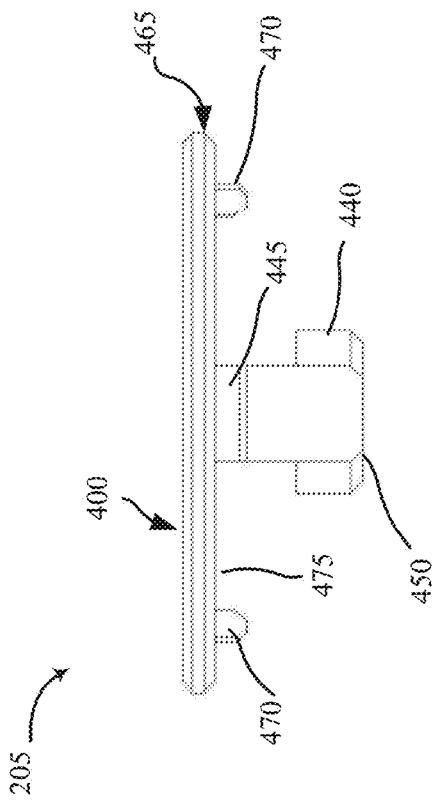
FIG. 4B
FIG. 4C
FIG. 4A

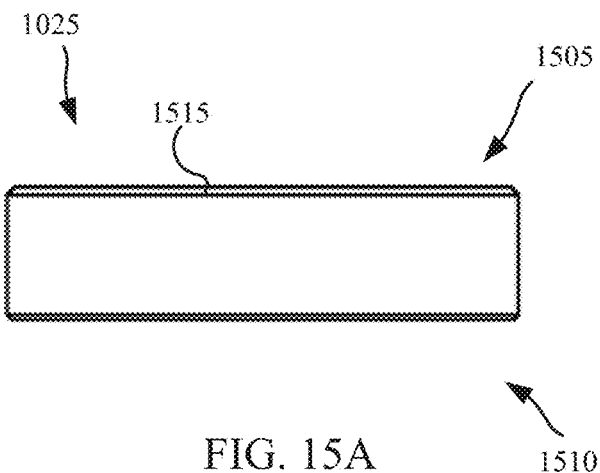
FIG. 15A
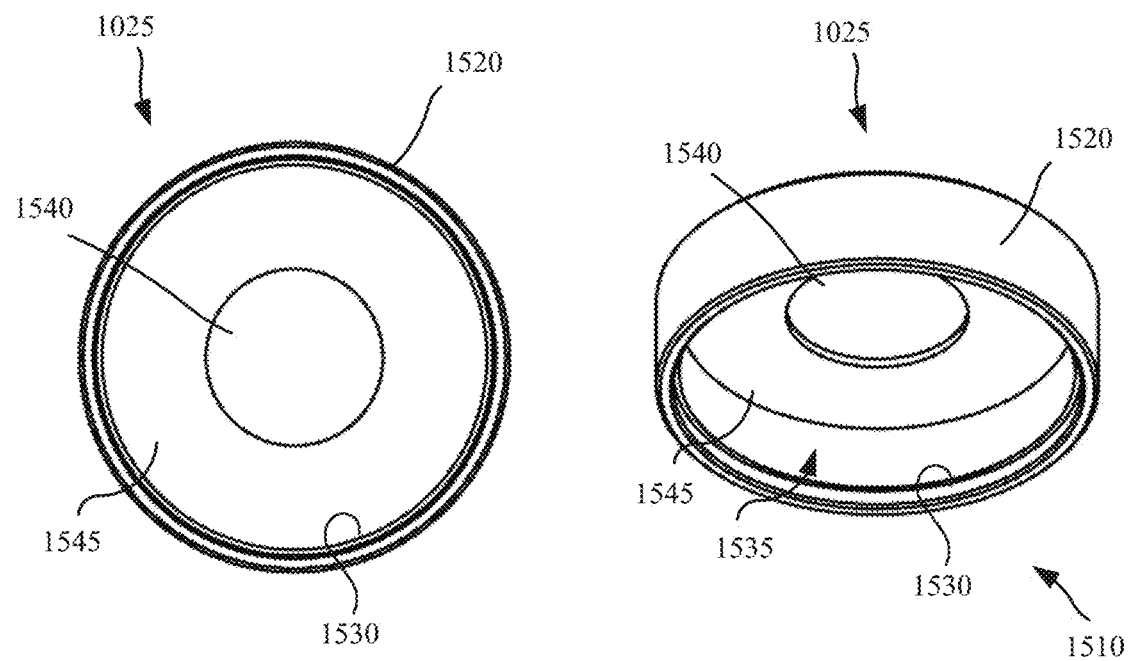
FIG. 15B
FIG. 15C

INTEGRATED CYCLING TOOL

CROSS-REFERENCE TO RELATED PATENT APPLICATION

This is a continuation in part of U.S. patent application Ser. No. 15/448,390, titled "Integrated Cycling Tool," filed on Mar. 2, 2017, which is a continuation of U.S. patent application Ser. No. 14/657,471, titled "Integrated Cycling Tool," filed on Mar. 13, 2015.

BACKGROUND

The present disclosure, for example, relates to bicycles, and more particularly to cycling tools integrated into a bicycle frame.

Cyclists often need tools to do on-the-road/trail repairs of a bicycle. The tools often are carried by the individual or attached to bicycle components using various mounting accessories and are extraneous to the bicycle. The tools may be difficult to remove from the storage location and may not be readily available for a cyclist to use. Carrying a tool on the individual may be uncomfortable or may take up additional storage space. Exterior mounted tools can also fall off the bicycle due to vibration and/or motion of the bicycle. A need exists for a tool that is readily available for a cyclist without hindering a cyclist's experience.

SUMMARY

The systems and methods described herein relate to cycling. More specifically, the systems and methods described herein relate to an integrated cycling tool. The cycling tool may be integrated into the bicycle components to reduce the external modifications to a bicycle. This may enable a cyclist to carry a tool with them without the worry of carrying the tool, or the tool falling off the bicycle. The cycling tool may comprise multiple components and may be used to fix various parts of a bicycle. The cycling tool may fit within the confines of the bicycle and provide minimal to no impact to the rider or the functionality and performance of the bicycle.

In one embodiment, a cycling tool is described. The cycling tool includes at least one tool operable to adjust a component of a bicycle and a tool holder having a first portion sized to fit within a steering column of a bicycle. The tool holder comprises at least one cavity formed in the tool holder and sized to receive a portion of the at least one tool. The tool holder retains the at least one tool within the steering column to store the at least one tool.

In some embodiments, the tool holder may further include a receiver. The receiver may be configured to support the at least one tool. In some instances, the at least one cavity may include at least two cavities formed in an upward-facing surface of the receiver. The at least one tool may include at least two tools and the at least two tools may be separately received in the at least two orifices. In some embodiments, the at least two tools may releasably connect to each other to form a combination tool.

In some instances, an elongated fastener may be operable to releasably connect the tool holder to the steering column. In some instances, a thru-hole may be proximate the receiver. The thru-hole may be arranged to receive the elongated fastener. In some embodiments, a cover may be releasably connected to the tool holder. In some embodiments, the cover may be positioned atop the steering column. In some instances, the tool holder may further comprise a second portion sized to abut against an end surface of the steering column.

In another embodiment, a method of installing a mechanical multi-component cycling tool in a steering column of a bicycle is described. The method includes inserting a first portion of a tool holder into the steering column, a second portion of the tool holder abutting against an end surface of the steering column, wherein the tool holder is configured to support at least one tool stored within the steering column. The method additionally includes securing the tool holder to the steering column at a location internal to the steering column.

In some embodiments, the method may include installing the at least one tool in the tool holder and releasably securing a cover on the second portion of the tool holder to enclose the at least one tool. Installing the at least one tool in the tool holder may include inserting a first portion of the at least one tool through an aperture formed in the tool holder and supporting a second portion of the at least one tool on a receiver portion of the tool holder. Securing the tool holder to the steering column may include adjusting a tensioning structure to a predetermined distance from the end surface of the steering tube, wherein the tensioning structure may be connected to the tool holder. Securing the tool holder to the steering column may include fastening the tool holder to the tensioning structure with at least one fastener.

In another embodiment, a cycling tool is described. The cycling tool includes at least one L-shaped tool and a tool holder. The tool holder includes a first portion sized to be positioned within a steering column of a bicycle and a second portion sized to sit atop a top end of the steering column. At least one slot is formed within the tool holder to receive a portion of the at least one L-shaped tool to support the at least one tool within the steering column.

In some embodiments, the cycling tool may include a fastener and a thru-hole formed within the tool holder to receive the fastener. The cycling tool may include a cover releasably connected to the tool holder. The cycling tool may include at least one magnet connected to the tool holder. The at least one magnet may releasably connect the at least one L-shaped tool to the tool holder. In some instances, the cover may apply a force to secure the at least one L-shaped tool in the tool holder when the cover is connected to the tool holder. In some embodiments, the cover may be threadably connected to the tool holder. The at least one L-shaped tool may include first and second L-shaped tools. In some embodiments, the first L-shaped tool may include a tool bit sized to receive a portion of the second L-shaped tool which may releasably connect the first and second L-shaped tools to each other.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 3C is a diagram illustrating one example of a front portion of a bicycle;

FIG. 3D is a diagram illustrating one example of a front portion of a bicycle;

FIG. 4A is a diagram illustrating one example of a receiver;

FIG. 4B is a diagram illustrating one example of a receiver;

FIG. 4C is a diagram illustrating one example of a receiver;

FIG. 15A is a diagram illustrating one example of a cover of an integrated cycling tool;

FIG. 15B is a diagram illustrating one example of a cover of an integrated cycling tool;

FIG. 15C is a diagram illustrating one example of a cover of an integrated cycling tool;

Figure 1:
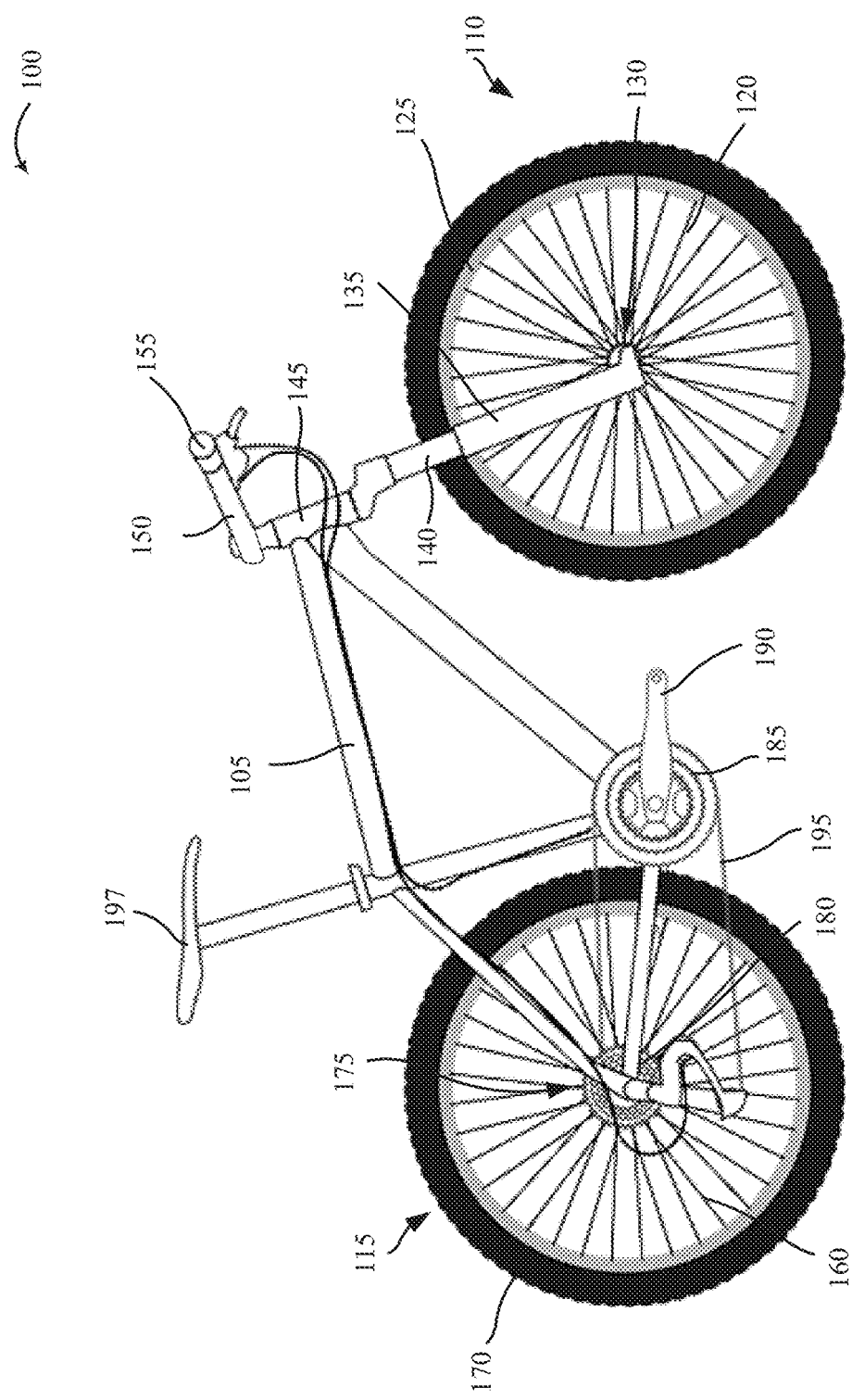
FIG. 1 is a diagram illustrating an exemplary bicycle in which the present systems and methods may be implemented.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The systems and methods described herein relates to cycling. More specifically, the systems and methods described herein relate to an unobtrusive, easily accessible cycling tool. The cycling tool may comprise multiple components and may be used to fix various parts of a bicycle. The tools may comprise Allen wrenches, spoke tightening tool, and the like. The tools may additionally comprise uses not related to a bicycle. For example, the integrated cycling tool may include a bottle-opener, a utility knife, a corkscrew, a cavity to hold something such as a key, or the like. The cycling tool may not require any special hardware to attach externally to a bicycle. Rather, the cycling tool may fit within the confines of the bicycle and provide minimal to no impact to the rider or the functionality and performance of the bicycle.

FIG. 1 is an example of a bicycle 100 that could be used with the exemplary cycling tool. The bicycle 100 may be any type of bicycle including a mountain bicycle, a road bicycle, touring bicycles, hybrid bicycles, cyclo-cross bicycle, utility bicycle, triathlon bicycle, snow bicycle, fixed gear bicycle, motorized bicycle, and the like. The bicycle may include a main frame 105, a front wheel 110, and a rear wheel 115. Various components of the bicycle 100 may function together to allow a cyclist to propel the bicycle 100 as desired.

The front wheel 110 may include multiple spokes 120. The spokes 120 may connect to a front wheel rim 125 with one or more spoke nipples (not shown). The spokes 120 may come together at a center point 130 of the front wheel 110 which may connect to a fork 135. The fork 135 may connect to the main frame 105 of the bicycle 100 at a head tube 140. For example, the fork 135 may connect to a steering tube 145. The steering tube 145 may be substantially cylindrical and may insert into a complimentary-sized substantially-cylindrical hollow portion of the head tube 140. A stem 150 may couple to the steering tube 145. The stem 150 may connect a handle bar system 155 to the steering tube 145 and allow a cyclist to steer the bicycle 100. The components may be one-piece components, inseparable assemblies, multi-piece assemblies, or the like. The exact configuration of the various components will depend on the type of bicycle and its purpose.

The rear wheel 115 may additionally include multiple spokes 160. The spokes may attach to a rear wheel rim 170 via spoke nipples (not shown). The spokes 160 may come together at a center point 175 where the main frame 105 may connect to the rear wheel 115. A series of gears 180 may be proximate the rear wheel 115 and may connect to a series of gears 185 proximate a pedal system 190 via a chain 195. A cyclist may use the pedal system 190 to propel the bicycle 100 in a desired direction at a desired pace. The cyclist may sit atop a saddle 197 which may be coupled to the main frame 105. Various components of the bicycle 100 may not be disclosed in this elementary discussion of the main components of a typical bicycle. However, other components not discussed herein may be used in a bicycle assembly. The discussion herein is meant to provide a high level overview of a bicycle. Different types of bicycles may have various additional and/or alternative components and even the same class of bicycle will have various components based on manufacturer, cost, and the like.

Various components of the bicycle 100 may require attention. For example, components may need to be adjusted, various components may require fixing, and the like. One or more tools may be required to tend to the bicycle 100. If the necessary tools are attached to the bicycle 100, the cyclist and/or mechanic may be able to tend to the bicycle 100 quicker. Additionally, if the cyclist is currently on a bicycle tour, the cyclist may not have the accessibility of tools in a workshop to correct the bicycle 100. Instead, to continue the bicycle tour, the cyclist may need to tend to the bicycle 100 while away from a home base. An integrated cycling tool 200 (FIG. 2) may provide the cyclist with the comfort of knowing a tool is always with the bicycle 100 and will not interfere with the functionality of the bicycle, the appearance of the bicycle, or the like. By integrating the tool into the steering tube of a bicycle, the tool may be protected from being lost due to vibrations, movement, crashes, and the like. The location of the tool may help the cyclist recover the tool when necessary.

Additionally, an integrated cycling tool 200 may prevent a cyclist from having to remember to pack a tool prior to a bicycle trip. In other embodiments, the integrated cycling tool 200 may be personalized to the specific bicycle such that the cyclist and/or mechanic may not have to look through various tool boxes to find tools to properly fit the components of the bicycle prior to servicing the bicycle. In one exemplary embodiment, the integrated cycling tool 200 may be located within the confines of the steering tube 145.

Figure 2:
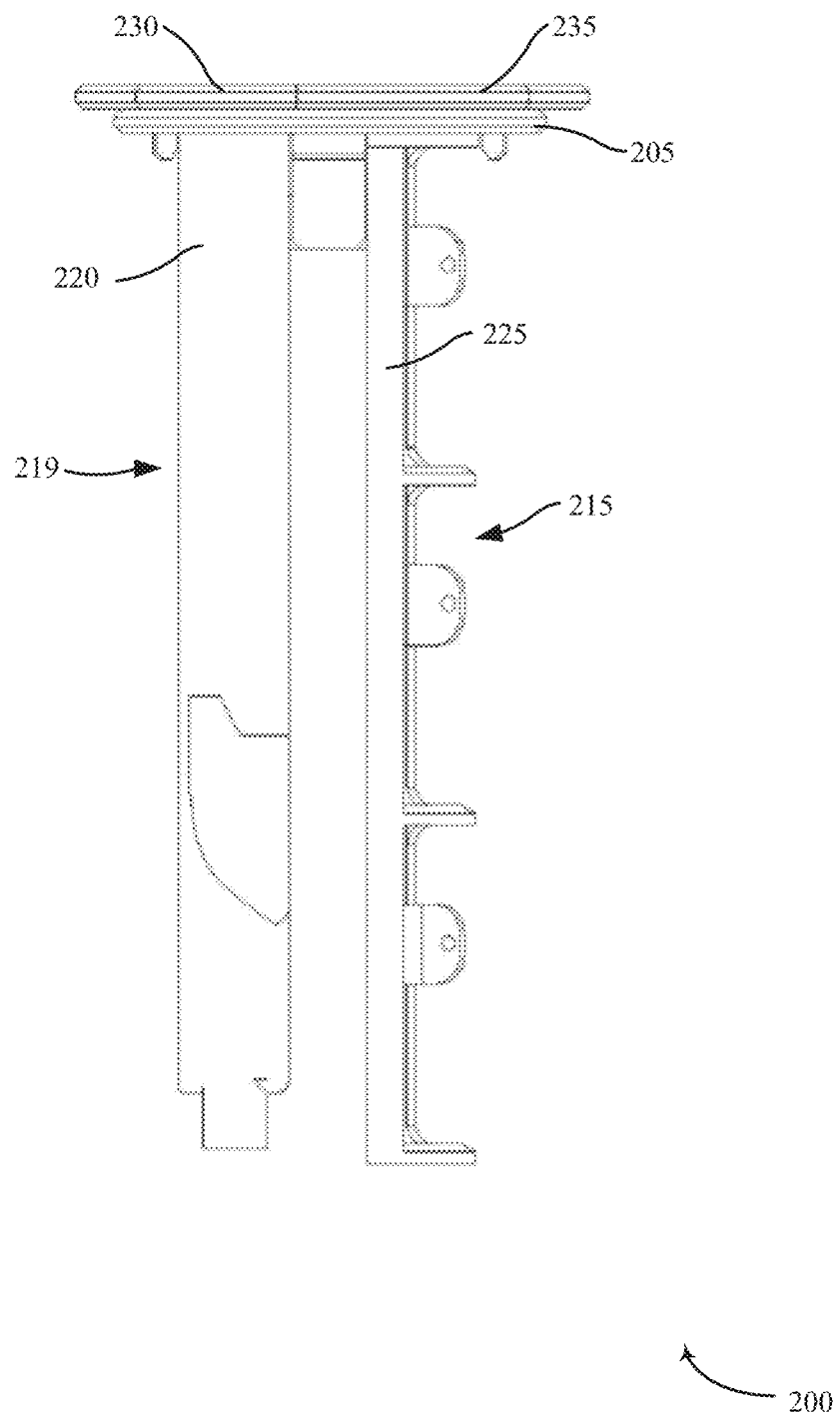
FIG. 2 is a diagram illustrating one example of an integrated cycling tool.

FIG. 2 is an exemplary view of the integrated cycling tool 200 assembled external to the steering tube 145 (FIG. 1). The integrated cycling tool 200 may comprise a receiver 205, a bolt (not shown), and two halves. The two halves may comprise a handle 210 and a bit holder 215. When the receiver 205 is installed in a steering tube (e.g. steering tube 145, FIG. 2D), the bolt may hold the receiver 205 in place as discussed previously with regards to FIG. 2D. The receiver 205 may have one or more slots for accepting either of the halves.

The handle 210 and bit holder 215 may each comprise a body 220, 225 and a cover portion 230, 235. The bodies 220, 225 may comprise substantially elongated members with a top surface and a lower half. The body 220, 225 may be inserted through a slot (see FIG. 4) in the receiver 205 and into the hollow of the steering tube. In this configuration, the bodies of the bit holder 215 and handle 210 may form a substantially cylindrical shape. The cover portion 230, 235 may sit atop the receiver 205 above the steering tube 145 and allow a cyclist to easily remove both halves of the tool. The cover portion 230, 235 may comprise a substantially semi-circular shape. In some embodiments, the cover portion 230, 235 may include a feature which may allow the cyclist remove the half from a steering tube.

Figure 3B:
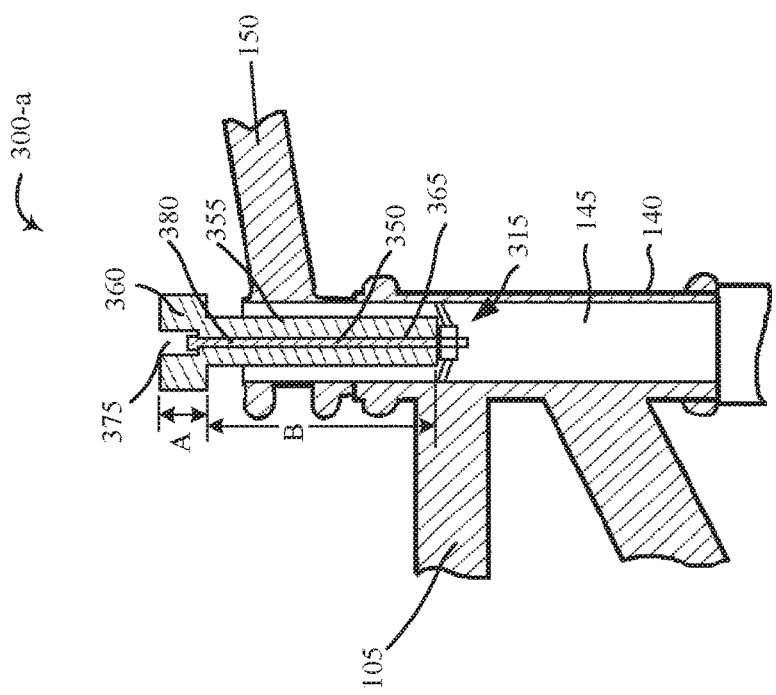
FIG. 3B is a diagram illustrating one example of a front portion of a bicycle.
Figure 3A:
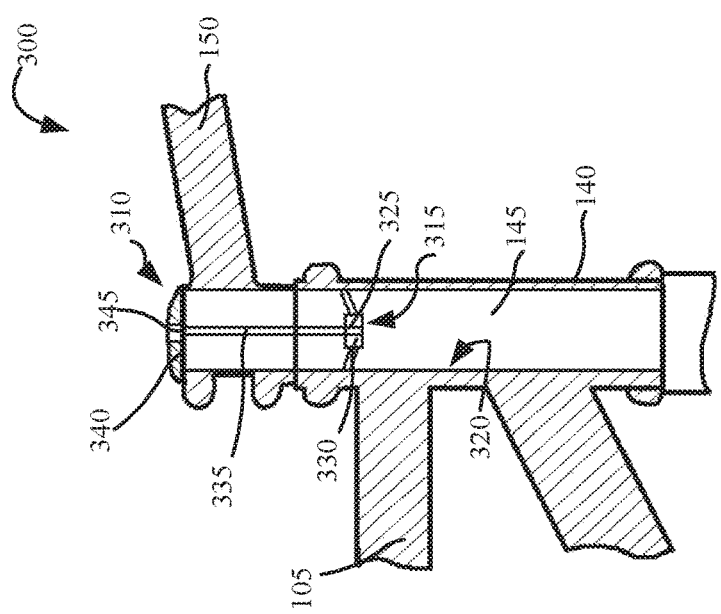
FIG. 3A is a diagram illustrating one example of a front portion of a bicycle.

FIG. 3A is an exemplary cutaway view of a front portion 300 of a bicycle (e.g., bicycle 100) without the integrated cycling tool 200 (FIG. 2). The front portion 300 may include the main frame 105, the head tube 140, the steering tube 145, and the stem 150.

The cutaway view may show the steering tube 145 installed within the head tube 140. The steering tube 145 may be connected to a fork (e.g. fork 135, FIG. 1) at a lower end 305 and may protrude slightly above the head tube 140 at an upper end 310. The stem 150 may couple to the steering tube 145 at the upper end 310. The steering tube 145 may be held in place by one or more bearings (not shown). A star nut 315 may provide tension for proper bearing placement of the steering tube 145. In other embodiments, some other internal structure in the steering tube 145 may provide the proper tensioning required. The star nut 315 may comprise a star-like cross-section and may be tight fit against an inner wall 320 of the steering tube 145. In some embodiments, the star nut 315 may comprise a series of threads proximate a thru-hole 325 in the center of a body 330 of the star nut 315. The threads may accept a bolt 335 with complementary threads.

In some embodiments, to prevent debris and other unwanted materials from entering the hollow of the steering tube 145, a cap 340 may be positioned on top of the steering tube 145. The cap 340 may have a thru-hole 345 for allowing the bolt 335 to connect to the star nut 315 and secure the cap 340 onto the steering tube 145. Other structure may be used to secure the cap 340 and/or receiver (e.g. receiver 205, FIG. 2D) to the steering tube 145. For example, an expander nut may be used. Additionally, other fasteners that may be secured used tension on the inner wall 320 of the steering tube 145. The structure may be inherent in a bicycle or may be added by a user after market.

FIG. 3B is an exemplary cutaway view of a front portion 300-a of a bicycle (e.g., bicycle 100) with the bolt 335 and the cap 340 removed. The front portion 300-a may be one example of front portion 300 described with reference to FIG. 3A. A bolt 350 and a star nut adjuster (adjuster 355) are shown in a beginning position. The bolt 350 may be one example of an elongated fastener that may connect the adjuster 355 to the star nut 315. As shown in FIG. 3D, the adjuster 355 may additionally be example of fastener that may connect the receiver 205 to the star nut 315. The front portion 300-a may include the main frame 105, the head tube 140, the steering tube 145, and the stem 150.

The adjuster 355 may comprise a top portion 360 and a bottom portion 365. The bottom portion 365 may be substantially cylindrical and may be sized such that it fits within the hollow portion of steering tube 145. The top portion 360 may be any shape and may be sized larger than an outer diameter 370 of the steering tube 145. In some embodiments, the top portion 360 may be cylindrical for ease of manufacture, but may additionally comprise any shaped that exceeds the outer diameter 370 of the steering tube 145. A height A of the top portion 270 may be any acceptable height to provide structural stability. In this embodiment, the height A may be approximately 1.5 inches. A height B of the bottom portion 265 may be specifically sized similarly to the height of integrated cycling tool 200 (FIG. 2). This may allow the adjuster 355 to move the star nut 315 towards a fork (e.g. fork 135, FIG. 1) and create a hollow portion for the integrated cycling tool 200 to fit within the head tube 140. In this embodiment, the height B may be approximately 3.5 inches. The height B may be adjustable based on the height of the integrated cycling tool as discussed further with reference to FIG. 5.

The adjuster 355 may comprise a variety of materials. In exemplary embodiments, the adjuster may comprise a metal such as aluminum, stainless steel, or the like. The adjuster 355 may additionally comprise a non-metallic such as a polymer or wood. The adjuster 355 may comprise a durable material able to withstand a striking motion to force the star nut 315 down (FIG. 3C).

The star nut 315 may prevent the adjuster 355 from penetrating the steering tube 145 to its full height B. Instead, the adjuster 355 may sit atop the star nut 315 with a gap C between the top portion 360 of the adjuster 355 and the top 310 of the steering tube 145. The adjuster 355 may have a counterbore 375 proximate a center of the top portion 360. The counterbore 375 may connect to a thru-hole 380. The counterbore 375 and thru-hole 380 may accommodate the bolt 350. The bolt 350 may pass through the counterbore 375 and thru-hole 380 and attach to the star nut 315.

FIG. 3C is an exemplary cutaway view of a front portion 300-b of the bicycle with the bolt 335 and the cap 340 removed. The bolt 350 and the adjuster 355 are shown in a final position. The front portion 300-b may be an example of the front portion 300 described with reference to FIG. 3A. The front portion 300-b may include the main frame 105, the head tube 140, the steering tube 145, and the stem 150.

Once the adjuster 355 is properly installed in its initial position, a cyclist, mechanic, or another person may push the adjuster 355 downwards as indicated by arrow D. The cyclist may use their own means of pushing the adjuster 355 down, or may use a tool such as a hammer, mallet, or other suitable tool to apply force to the adjuster 355. The mallet may strike the adjuster 355 on the top portion 360. The adjuster 355, may, in turn, push the star nut 315 further into the steering tube 145. Using the bolt 350 to connect the adjuster 355 to the star nut 315 may allow the star nut 315 to maintain a substantially horizontal alignment in the steering tube 145, wherein the star nut 315 is substantially perpendicular to the steering tube 145. The substantially horizontal alignment may ensure proper pressure is exerted on the bearings (not shown). Additionally, proper alignment may ensure the integrated cycling tool 200 (FIG. 2) may be properly installed.

The adjuster 355 may push the star nut 315 into the steering tube 145 at a depth E. The depth E may allow a tool, such as the integrated cycling tool 200 (FIG. 2), to be installed within the confines of the steering tube 145. The depth E may be adjusted depending on the overall size of the integrated cycling tool 200. For example, the depth E may be reduced to accommodate a smaller tool. If the depth E is reduced, it may be recommend to use a different adjuster 355, or to use an additional component to ensure the star nut 315 is located at a proper depth. Similarly, the depth E may be increased, additionally creating a need for a different adjuster 355 with a longer height.

FIG. 3D is an exemplary cutaway view of a front portion 300-c of a bicycle with the adjuster 355 removed and a receiver 205 and the bolt 350 installed. The front portion 300-c may be an example of the front portion 300 described with reference to FIG. 3A and may comprise similar and/or the same components. The front portion 300-c may include the main frame 105, the head tube 140, the steering tube 145, and the stem 150.

Once the star nut 315 is positioned properly, the adjuster 355 may be removed. First the bolt 350 is removed, and then the adjuster 355 is removed. Next, a receiver 205 may be installed on top 310 of the steering tube 145. The receiver 205 may be a part of the integrated cycling tool 200 (FIG. 2). The receiver 205 may have substantially circular shape that sits on the top 310 the steering tube 145. The body of the receiver 205 may rest within the steering tube 145. The bolt 350 may tighten the receiver 205 in place atop the steering tube 145, with a portion of the receiver 205 protruding into the steering tube 145. As discussed further with reference to FIG. 4, the receiver 205 may accept the bolt 350 and allow the bolt 350 to pass through the body of the receiver 205 and attach to the star nut 315. The bolt 350 may secure the receiver 205 to the steering tube 145.

FIG. 4 is an example of the receiver 205. FIG. 4A is a top down view of the receiver 205 as the receiver 205 would be installed in a steering tube (e.g., steering tube 145, FIGS. 1 and/or 3). FIG. 4B is a side view of the receiver 205. FIG. 4C is a rotated side view of the receiver 205 of FIG. 4B. The receiver 205 may be an example of receiver 205 described with reference to FIGS. 2 and/or 3D. In some embodiments, the receiver 205 may be installed in a steering tube 145 and may accept the handle 210 (FIG. 2) and the bit holder 215 (FIG. 2).

FIG. 4A shows a top surface 400 of the receiver 205 having a circular inner diameter 405 and circular outer diameter 410. The outer diameter 410 may be any size diameter that exceeds the inner diameter 405 of a steering tube (e.g. steering tube 145, FIG. 1). In some embodiments, the shape of outer cross-section of the receiver 205 may not be circular but may be any polygon that enables the receiver 205 to sit atop a steering tube. The receiver 205 may have one or more slots 415, 420. The slots 415, 420 may be substantially semi-circular in shape. In other embodiments, the slots 415, 420 may be sized appropriately to receive the cross-sectional shape of the handle and bit holder (e.g. handle 210 and bit holder 215, FIG. 2).

One or more magnets 425 may be proximate the top surface 400 of the receiver 205. The magnets 425 may mate with one or more magnets proximate a cover of the bit holder and/or handle (as discussed with reference to FIG. 7). The magnets 425 may provide positive retention on the bit holder and/or the handle preventing them from coming loose during a bicycle ride. While FIG. 4A shows eight magnets 425, more or less magnets may be used as long as positive retention is attained. While magnets 425 are disclosed in both the covers and the receiver 205, other means of fastening the cover and the receiver 205 may be used. For example, the cover may lock to a feature on the receiver 205, Velcro may be used, the cover may snap onto the receiver 205, the cover and/or the receiver 205 may be ferromagnetic and therefore magnetic and attach to magnets on the mating part. The cover may clip to the receiver 205, may be turned by hand to lock in a screwing type mechanism, and the like.

The receiver 280 may be metallic and may comprise a number of metals or metal alloys including iron, nickel, and cobalt. In other embodiment, the receiver 205 may comprise an aluminum, aluminum alloy, steel, steel alloy, titanium, or the like. The receiver 205 may additionally comprise a non-metallic material such a polymer. The receiver 205 may be subjected to weather such as rain, snow, mud, and the like. Therefore, in some embodiments, the receiver 205 may comprise a non-degrading material or be treated with a coating to prevent the degradation of it. For example, some metals may rust and therefore, the metal should be rustproof metal or receive treatment Some specific examples of materials may include titanium, stainless steel, aluminum, carbon fiber, and the like.

A bridge 430 may run through the middle of the inner diameter 405 of the receiver 205 may be thick enough to accommodate a thru-hole 435 and may add structural stability to the receiver 205. The thru-hole 435 may be size by a bolt (e.g. bolt 350, FIGS. 3B-3D) necessary to mate with a star nut (e.g. star nut 315 FIGS. 3A-3D). The star nut may have a predetermine thread size and hole size, the bolt may be sized to match it. The bridge 430 may be wide enough to accommodate the bolt size, or the thru-hole 435 may have additional material 440 surrounding the thru-hole 435 to provide additional structural stability.

The overall shape of the bridge 430 may be symmetrical and may have a curved U-type shape. For example, the bridge 430 may have a flat bottom surface 450, a curved side surface 455, and a flat surface 460 beneath the side surface 445 of the bridge 430. The side 465 of the top surface 400 may be substantially rounded. For example, the side 465 may have rounded edges, chamfers, or the like.

In some embodiments, the thru-hole 435 (FIG. 4A) and surrounding material 440 may not be level with the top surface 400. For example, as shown in FIG. 4C, the material 440 and thru-hole 435 may be below the top surface 400. This may additionally be seen in FIG. 4B by the gap 470. Moving the material 440 and the thru-hole 435 below the top surface 400 may enable the fastener to be flush or below the top of the receiver. The location of the material 440 and thru-hole 435 may be oriented in any vertical location in the receiver 205. For example, the material may be located proximate the top surface 400, a bottom surface 450, or anywhere there between. In some embodiments, the material 440 may be located further from the top surface. The thickness of the material 440 provided may account for dimensional stability.

Also shown in FIG. 4C is a pair of protrusions 470 from a bottom surface 475 of the receiver 280. The protrusions 470 may extend below the bottom surface 475 of the receiver 205. The protrusions 470 may have a semicircular outer surface which may align with an inner diameter of a steering tube similar to the side surface 445 of the bridge 430. The protrusions 470 may fit within the confines of a steering tube and properly align the receiver 205 on top of the steering tube 145. The protrusions may be in addition to the side surfaces 445 of the bridge or, in some embodiments, may be omitted.

FIG. 5 is diagram of an exemplary bit holder 215. The bit holder 215 shown does not have a cover attached. The cover and bit holder 215 may be manufactured as a single piece or may be a two piece assembly. In this embodiment, the cover and bit holder 215 are a two-piece assembly.

Figure 5A:
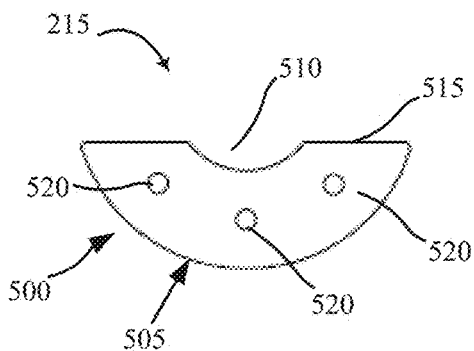
FIG. 5A is a diagram illustrating one example of a bit holder.

FIG. 5A shows a top down view of the bit holder 215 with a top surface 500 showing. The cross-section of the bit holder 215 may be substantially similar to the slot 415, 420 (FIG. 4A) provided in the receiver 205 (FIG. 4A). This may allow the bit holder 215 to pass through the slot and be stored within a steering tube of a bicycle (e.g., steering tube 145 in bicycle 100, FIG. 1). The cross-section may be substantially semi-circular outer surface 505 with a semi-circular cut-out 510 located in approximately the center of a flat edge 515 of the top surface 500. The semi-circular cut-out 510 may allow the bit holder 215 to pass by the bolt hole material in the receiver. The top surface 500 of the bit holder 215 may have one or more protrusions 520. The protrusions 520 may mate with holes on an underside of a cover of the bit holder 215 as discussed with reference to FIG. 7.

Figure 5B:
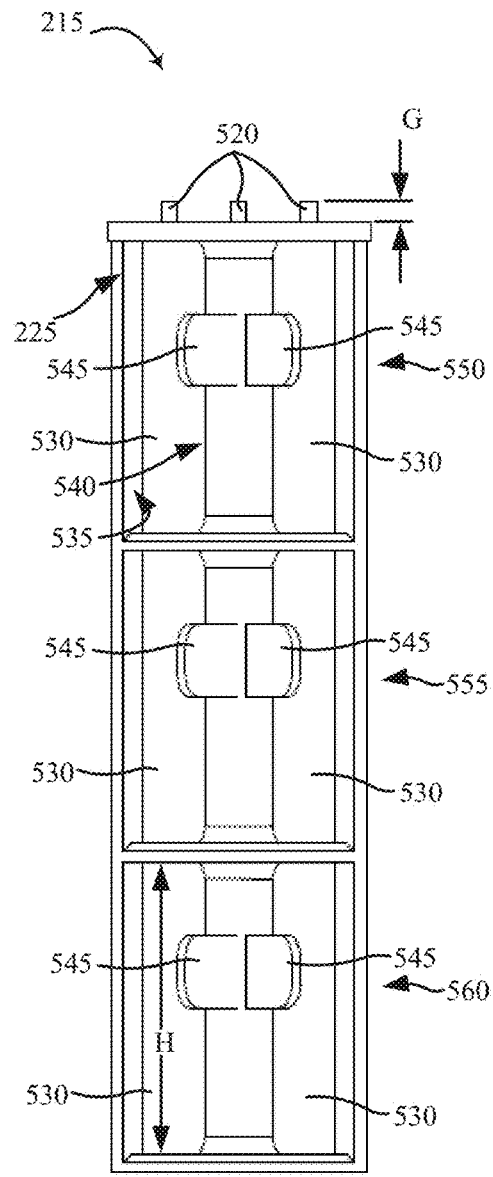
FIG. 5B is a diagram illustrating one example of a bit holder.

The height G of the protrusions 520 may be seen in FIG. 5B. If the cover and the bit holder 215 are adhered together, the height G of the protrusions 520 may be less than a width of the cover. This may allow the protrusions 520 to fit into the holes and create a stronger adhesive bond between the bit holder 215 and the cover. In other embodiments, the height G of the protrusions 520 may be greater than the width of the cover. The holes in the cover may be thru-holes. When the cover is installed on the bit holder 215, the protrusions 520 may stick out on the other side of the cover. The tops of the protrusions 520 may be hammered and flared to provide a riveted connection between the cover and the bit holder 215. In some embodiments, multiple methods may be used to fasten the cover to the bit holder 215. For example, the cover may be welded, snap fit, or likewise to the bit holder 215. Other methods may include locking the two pieces together or using different geometry than that visually represented in FIGS. 5A and/or 5B.

The bit holder 215 may include one or more slots or openings 530 for receiving a tool bit (not shown). The tool bit may be standard sized tool bits with an end to attach to a tool (such as the handle, see FIG. 6) and a second end that is a tool such as a hex wrench, a Phillips head bit, a flat head bit, hex hardware, Allen wrenches, or the like. The tool bits may be customized to working on a bicycle. For example, the Allen wrenches may be sized such as they match bolts proximate the bicycle. The overall size of the tool bit may be sized specifically for the bit holder 215 or may be standard purchase tool bits. The openings 530 may be sized wide enough to accommodate the tool bit without the tool bit falling through the opening 530. For example, the distance between a first side 535 of the opening 530 and a second side 540 of the slot may be less than the width of a tool bit. The slots may be sized less than an overall width of the tool bit but enough to allow the tool bit to fit within its confines.

A wing 545 may be proximate each opening 530. The wing 545 may be flexible and may hold a tool bit in place in the opening 530. The wing 545 may be any width but in the embodiment shown is less than the height of a tool bit. The thickness of the wing 545 may provide structural stability while still flexing to allow the tool bit to slide in and out of the opening 530. The wing 545 may be sized such that it puts a force on the tool bit while the tool bit is installed in the slot or opening 530. This may provide a positive retention force on the tool bit and prevent the tool bit from falling out of the bit holder 215.

The height H of each opening 530 may be consistent and may hold the same length tool bit. The height H may be customized to standard size tool bits or specialty tool bit sizing. Additionally, in alternative embodiments, the height H of each opening 530 may not be consistent. A first row 550 of openings 530 may have a taller height H than a second 555 or a third 560 row of the slots. Each row 550, 555, 560 may have different heights. While each individual opening 530 may also vary in height H, for ease of manufacture, the row of openings 530 may be substantially the same.

The bit holder 215 may accommodate several bits, and in the embodiment shown, accommodates six tool bits. The bit holder 215 may be reduced in size or lengthened in size to accommodate additional tool bits. In some embodiments, smaller or larger tool bits may additionally be used. Therefore, the same size bit holder 215 may hold more tool bits if they are of a reduced size or less if tool size increases. As the height H of each row 550, 555, 560 is adjusted and/or as tool bits are added and/or removed, the overall height of the bit holder 215 may additionally adjust accordingly.

Figure 5C:
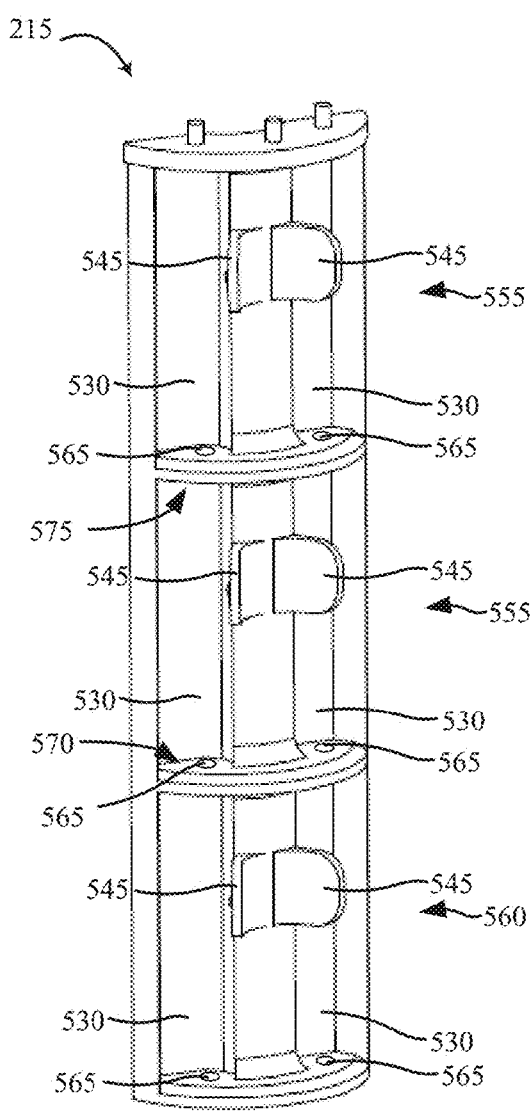
FIG. 5C is a diagram illustrating one example of a bit holder.

FIG. 5C shows an exemplary isometric view of the bit holder 215. The isometric view shows a variation of holding the tool bits in place. The tool bits may comprise ferromagnetic material and as such, may be magnetic. Each opening 530 may comprise a fastener to hold the tool bit in place. The fastener may comprise the wing 545. In additional and/or alternative embodiment, each opening 530 may include a magnet 565 which may be of such a strength as to hold the tool bit in place. The magnets 565 may be used instead of the wings and/or may be used in addition to the wings 545. A magnet 565 may be proximate a bottom side 570 of each opening 530. In alternative embodiments, a magnet (not shown) may be proximate a top side 575 of each opening 530. In still further embodiments, the magnet locations may not be consistent between slots. For example, row 550 may have the magnets proximate the bottom surface 570 whereas, the row 555 may use the same magnets as row 550 and therefore, the magnet would be proximate a top surface 575 of the openings 530. Other methods of holding the tool bit in place may additionally be used. The tool bits may fit into a slot, a hinged cover may hold the tool bits in place, multiple magnets may be used, and the like. In some embodiments, the openings 530 may be rotated in respect to the bit holder 215. Rotating the openings 530 may enable more tool bits to be held in the bit holder 215 and/or may enable a shorter bit holder 215 to be used if necessary.

The bit holder 215 may comprise a metallic material, wooden material, and/or a polymer material. The material may enable the wing 535 to be flexible. For different materials, the end geometry may alter to accommodate for these differences in materials. A polymeric material should withstand potential weather conditions. The polymeric material may be injection molded, printed using a 3-dimensional printer, or other known manufacture methods. Similarly, a metallic material may be cast, machined, or the like. Some specific examples of materials may include titanium, stainless steel, aluminum, carbon fiber, and the like.

FIG. 6 is an exemplary handle 210 according to one embodiment. The handle 210 may be sized to fit with a slot in the receiver (e.g., slot 415, 420 of receiver 280, FIG. 4A). The handle 210 may fit within a steering tube of a bicycle (e.g., steering tube 145, FIG. 1) when the integrated cycling tool 200 (FIG. 2) is fully assembled. The handle 210 makes receive one or more tool bits and act as a tool handle. The handle 210 may additionally have integrated tools.

Figure 6A:
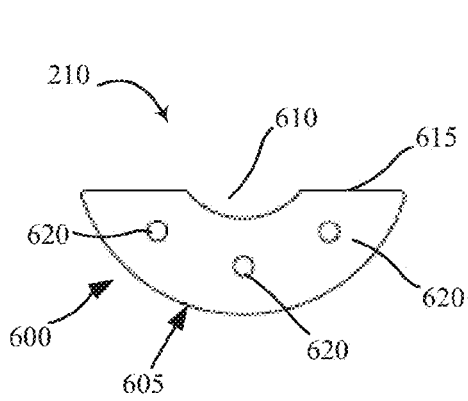
FIG. 6A is a diagram illustrating one example of a handle.

FIG. 6A shows a top surface 600 an exemplary cross-section for the handle 210. The handle 210 may have a similar cross-section to the bit holder 215 (FIG. 5). The handle 210 may have a substantially semi-circular cross-section 605. A semicircular cut-out 610 may be present in a flat portion 615 of the handle cross-section 605. The cut-out 610 may allow the handle 210 to pass by the material for the thru-hole in the receiver (e.g. material 440, FIG. 4A) and insert the handle 210 into a steering tube of a bicycle.

One or more protrusions 620 may be present in the top surface 600 of the handle 210. The protrusions 620 may be substantially circular in shape, or may be any other shape. The protrusions 620 may mate with holes on an underside of a cover of the handle 210 as discussed with reference to FIG. 7.

Figure 6B:
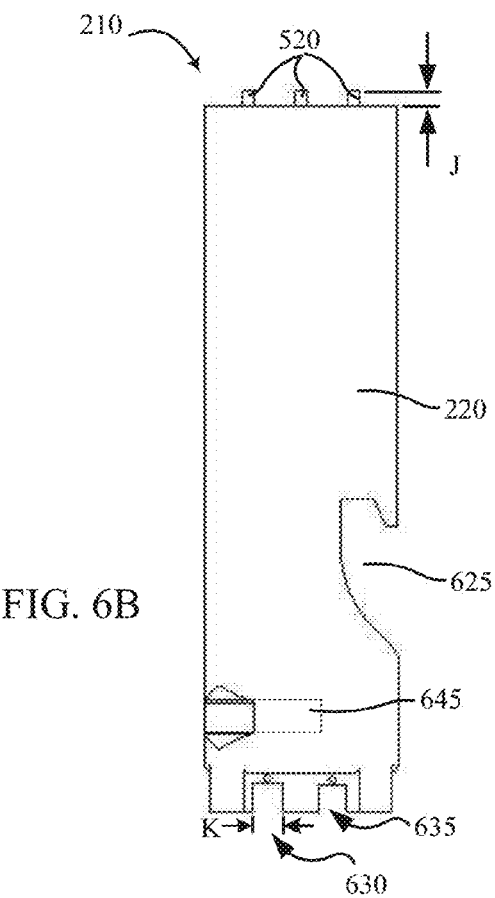
FIG. 6B is a diagram illustrating one example of a handle.

The height J of the protrusions 620 may be seen in FIG. 6B. If the cover and the handle 210 are adhered together, the height J of the protrusions 620 may be less than a width of the cover. This may allow the protrusions 620 to fit into the holes and create a stronger adhesive bond between the handle 210 and the cover. In other embodiments, the height J of the protrusions 620 may be greater than the width of the cover. The holes in the cover may be thru-holes. When the cover is installed on the handle 210, the protrusions 620 may stick out on the other side of the cover. The tops of the protrusions 620 may be hammered and flared to provide a riveted connection between the cover and the handle 210. In some embodiments, multiple methods may be used to fasten the cover to the handle 210. For example, the cover may be welded, snap fit, or likewise to the handle 210. Other methods may include locking the two pieces together or using different geometry than that visually represented in FIGS. 6A and/or 6B.

A bottle opener 625 may be present in the handle 210 as shown in FIG. 6B. The bottle opener 625 may be any standard size for a bottle opener. In the figure shown, the bottle opener 625 has a substantially heart-shaped cross-section and is located in a bottom half of the handle 210. The handle 210 may have additional features such as a storage space for small amounts of food and/or liquid. The handle 210 may additionally have a cavity which may house other items such as GPS tracker, a patch kit for repairing tires, spare tire tubes, a derailleur hanger, spoke nipples, keys (and/or key fobs), and the like. In some embodiments, the handle 210 may incorporate tire irons and/or levers which may be used to change a tire.

The handle 210 may additionally include one or more spoke tools. For example, the bottom of the handle 210 may have one or more indentations 630, 635 which may act as a spoke wrench. A spoke wrench may bring the overall wheel of the bicycle (front wheel 110 and/or rear wheel 115, FIG. 1) to a state of true. A state of true being when the bicycle wheel is a perfect circle and planar, such that the plane of the rim (e.g., front wheel rim 125 and/or rear wheel rim 170, FIG. 1) of the wheel is laterally between the two extremes of where the wheel is mounted to the frame. The height and width of the indentations 630, 635 may be sized to fit standard spoke nipples on a bicycle. A spoke nipple connects the metal spokes (e.g., spokes 120, 160, FIG. 1) to the rims of a bicycle wheel (e.g., rims 125, 170, FIG. 1). Standard spoke nipple sizes may include 0.127 inches, 0.130 inches, and/or 0.136 inches. Where the indentation width K is sized as the standard nipple size and the indentation 630, 635 fit over a flat portion of the spoke nipple.

Other spokes sizes may be available or prevalent depending on the type of bicycle, the manufacturer, and other conditions. In some embodiments, the handle 210 may come in a variation of indentations 630, 635 to fit a variety of spoke nipples. Additionally, the indentations 630, 635 need not be symmetric. Indentation 630 may be sized for a 0.127 inch spoke nipple whereas indentation 635 may be sized for a 0.136 spoke nipple. Any combination of spoke tool sizing may be incorporated into the handle 210. In other embodiments, the handle 210 may be specialized to the specific bicycle the tool is installed on. A cyclist may order the handle 210 to known specifications for their particular bicycle of choice.

Figure 6C:
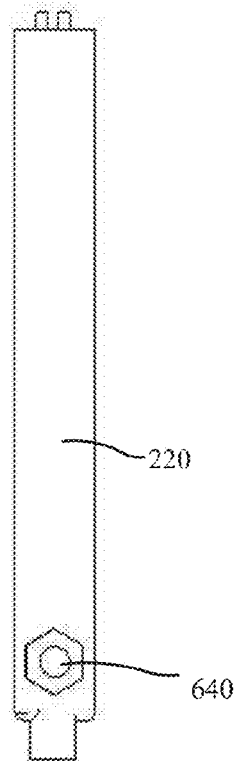
FIG. 6C is a diagram illustrating one example of a handle.

As mentioned previously, the handle 210 may additionally accept one or more tool bits which may be stored in the bit holder 215 (FIG. 5). As shown in FIG. 6C, the handle 210 may include a notch 640 which may accept a tool bit. The notch 640 may have a polygonal cross-section as shown in the figure to accept the tool bit. The exact shape of the polygon may match the cross-section of the tool bit stored in a bit holder (e.g., bit holder 215, FIG. 5). For example, Allen wrenches may have a hexagonal cross-section which may match the cross-section of the notch 640. The notch 640 may not extend through the body of the handle 210 and create a hole. Instead, the notch 640 may end part way through the handle 210 and provide a positive end point and create a cavity 645 as shown by the hidden lines in FIG. 6B. The cavity 645 may allow the tool bit to be firmly held in place without passing through the entirety of the handle 210. In some embodiments, the cavity 645 may be approximately 0.5 inches deep. In other embodiments, the cavity 645 may be sized specifically for the tool bits stored in the bit holder 215 (FIG. 5).

Figure 6D:
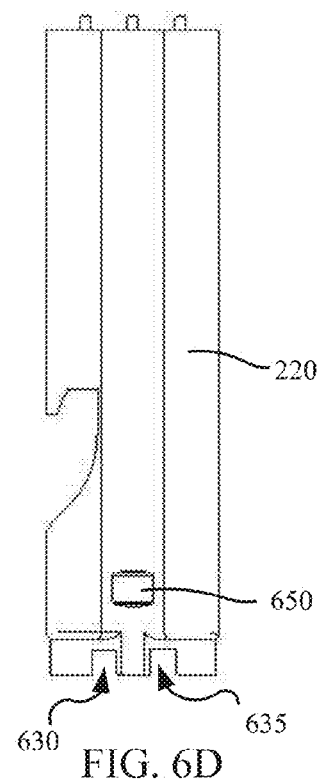
FIG. 6D is a diagram illustrating one example of a handle.

FIG. 6D shows a second notch 650 with the cut-out 610 of the flat portion 615 of the handle 305. The second notch 650 may act as a relief to the notch 640. In some embodiments, the notch 650 may be shaped to act as a wrench or a nut driver. The notch 650 may additionally be sized to receive a tool bit. This notch 650 may enable a cyclist and/or mechanic to decide which orientation to hold the handle 210 while servicing the bicycle.

The handle 210 may comprise a metallic material, wooden material, and/or a polymer material. For different materials, the end geometry may alter to accommodate for these differences in materials. A polymeric material should withstand potential weather conditions. The polymeric material may be injection molded, printed using a 3-dimensional printer, or other known manufacture methods. Similarly, a metallic material may be cast, machined, or the like. Some specific examples of materials may include titanium, stainless steel, aluminum, carbon fiber, and the like.

FIG. 7 is a diagram of an exemplary cover 700. The cover may be an example of the cover portions 230, 235 discussed with reference to FIG. 2. The cover 700 may attach to the handle 210 and/or bit holder 215 as discussed above with reference to FIGS. 5 and/or 6. The cover 700 may comprise a complimentary design such that when two covers 700 are aligned, they form a substantially circular outer shape.

Figure 7B:
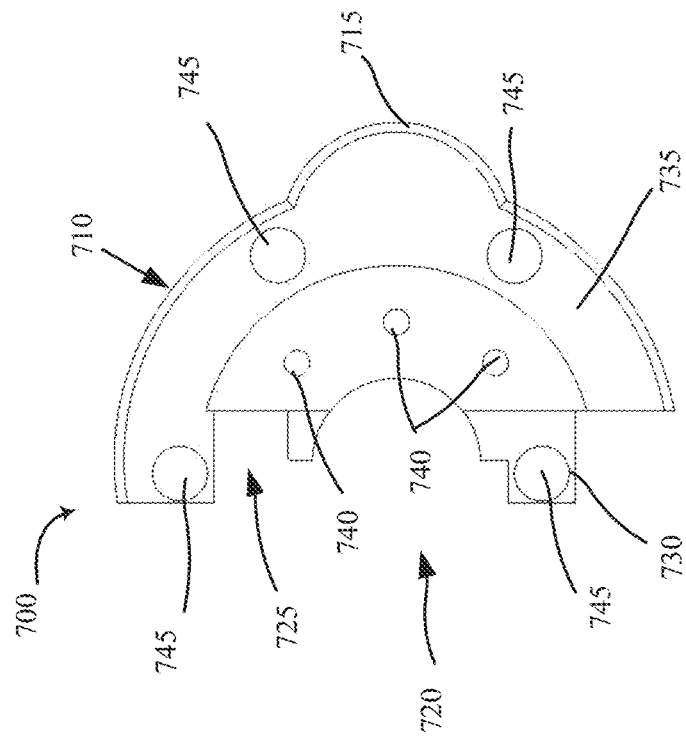
FIG. 7B is a diagram illustrating one example of a cover.
Figure 7A:
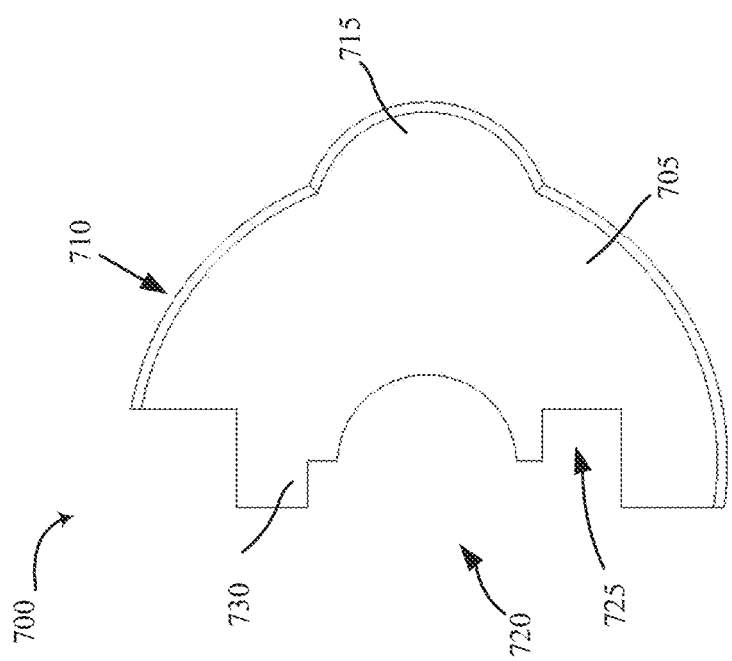
FIG. 7A is a diagram illustrating one example of a cover.

FIG. 7A is an exemplary top surface 705 of the cover 700. The top surface may have a substantially circular outer edge 710. This outer edge 710 may have a diameter equal to or larger than an outer diameter of the receiver 280 outer edge 710 (FIG. 4) and/or and outer diameter of a steering tube (e.g. steering tube 145, FIG. 1). This may prevent the handle 210 and/or bit holder 215 from falling into the hollow portion of a steering tube. Instead, the cover 700 may enable speedy removal of the handle 210 and/or bit holder 215 from the steering tube.

The cover 700 may have a grip 715 that extends beyond the outer edge 710 of the cover 700. The grip 715 may comprise any shape but in the exemplary embodiment may comprise a substantially semi-circular shape. The grip 715 may allow a cyclist to easily remove the cover 700 from the receiver (e.g., receiver 205, FIG. 2). For example, the grip 715 may extend beyond an outer diameter of a steering tube and provide a surface for a cyclist and/or mechanic to grasp and easily remove.

The inner side 720 of the top surface 705 of the cover 700 may have a key shape. The inner side 720 of the top surface 705 may be designed such that the two covers 700 may mate together to form a substantially circular shape. While the embodiment shown has a first groove 725 which may substantially match the shape of the tab 730 such that, in a second cover, the tab 730 may fit within the confines of the groove 725 forming the substantially circular shape. Other design parameters may additionally be used and this example is merely illustrative. The inner side 720 may alternatively comprise a flat edge rather than a keyed feature. Alternatively, the groove 725 and the tab 730 may be any complimentary polygonal shape. The cover 700 may comprise multiple grooves and tabs or other features to add to the design aesthetic of the feature.

FIG. 7B shows an exemplary bottom surface 735 of the cover 700. The bottom surface 735 may include one or more holes 740. The holes 740 may align with protrusions 520, 620 on the bit holder and/or handle (e.g., bit holder 215, handle 210, FIGS. 5 and/or 6). As discussed with reference to FIGS. 5 and 6, the holes 740 may extend through to the top surface 705 of the cover 700. In other embodiments, the holes 740 may extend through the top surface 705 of the cover 700 and the handle and/or bit holder may be riveted to the cover 700.

The bottom surface 735 may additionally have one or more magnets 745. The magnets 745 may align with one or more magnets 425 proximate the receiver 205 (FIG. 4A). While four magnets 745 are shown in FIG. 7B, this number is merely exemplary. The bottom surface 735 may have as few as one magnet 745 or may have multiple magnets 745. The magnets 745 shown are substantially circular but additionally may comprise any shape. For example, a magnet 745 may be manufactured that mimics a shape of the bottom surface 735. The quantity and size of the magnets should provide a positive retention force between the receiver and the cover 700 preventing either the bit holder and/or the handle from coming loose during the use of the bicycle.

In other embodiments, the cover 700 may comprise a ferromagnetic material and may negate the need for magnets 745. Instead, the ferromagnetic properties may allow the cover to mate with one or more magnets proximate the receiver (e.g., magnets 425, receiver 205, FIG. 4A). The cover 700 may comprise a metallic material, wooden material, and/or a polymer material. For different materials, the end geometry may alter to accommodate for these differences in materials. A polymeric material should withstand potential weather conditions. The polymeric material may be injection molded, printed using a 3-dimensional printer, or other known manufacture methods. Similarly, a metallic material may be cast, machined, or the like. Some specific examples of materials may include titanium, stainless steel, aluminum, carbon fiber, and the like.

In further embodiments, the cover 700 may be customizable. For example, the top surface 705 of the cover 700 may be made to specific customized requested. This may include an overall shape of the cover 700, the color of the cover 700 and/or a decorative element on the cover 700. The decorative element on the cover 700 may include a favorite sports team logo, a design, an initial, or the like. In further embodiments, the decorative element may be functional. For example, the top surface 705 of the cover 700 may include a name of the cyclist and an emergency contact number. This may enable a person to identify the cyclist should the cyclist become injured.

FIG. 8 is an exemplary alternative embodiment of a tool holder 800. The tool holder 800 may be an alternative version of an integrated cycling tool (e.g., integrated cycling tool 200, FIG. 1). The tool holder 800 may be size substantially similarly to a receiver (e.g., receiver 280, FIG. 4). The tool holder 800 may accept one or more L-shaped tools which may be used to service a bicycle. The L-shaped tools may comprise one or more Allen wrenches, an L-shaped Hex wrench, an L-shaped torx key, specialty tools designed specifically for bicycles, or other tools used to service a bicycle.

Figure 8A:
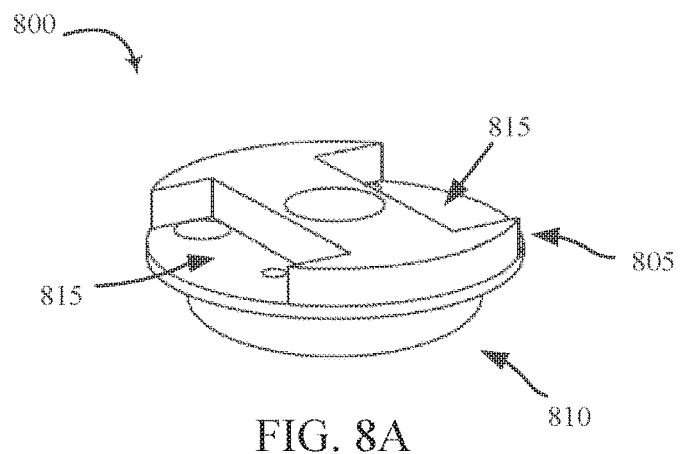
FIG. 8A is a diagram illustrating one example of a tool holder.

FIG. 8A shows an exemplary isometric view of the tool holder 800. The tool holder 800 may have a substantially circular shape. An upper portion 805 of the tool holder may sit atop a steering tube (e.g., steering tube 145, FIG. 1). A bottom portion 810 may fit within the confines of the steering tube. The upper portion 805 may have one or more notches 815 to hold one or more L-shaped tools.

Figure 8B:
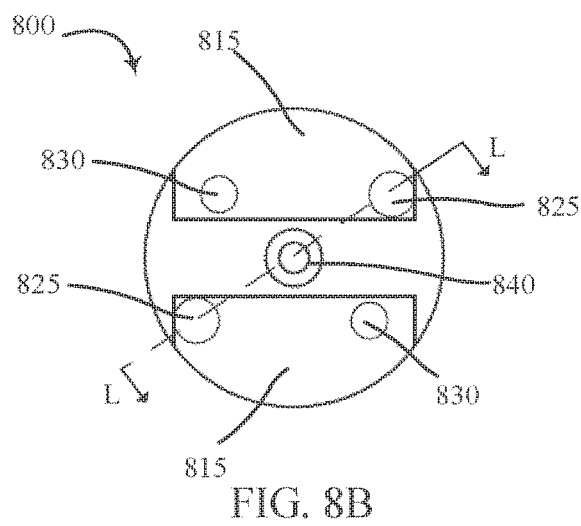
FIG. 8B is a diagram illustrating one example of a tool holder.

FIG. 8B shows an exemplary top surface 820 of the tool holder 800. The notches 815 may each include a thru-hole 825 and a magnet 830. The thru-hole 825 may enable the longer portion of the L-shaped tool to slide into it and store the body of the tool within the confines of the steering tube. The magnet 830 may provide a positive retention on the short portion of the L-shaped tool to prevent the tool from coming lose during bicycle operation. The magnet 830 may only provide retention if the tool is a ferromagnetic material. In other embodiments, a tab or wing feature may be incorporate to provide positive retention on the tool.

The top surface 820 may additionally include a thru-hole 840 receiving a bolt. The bolt may pass through the body of the tool holder 800 and fasten to a star nut inside a hollow of the steering tube. The bolt may secure the tool holder 800 to the steering tube similar to the bolt 350 securing the receiver 280 to the star nut and steering tube (see FIG. 2D).

Figure 8C:
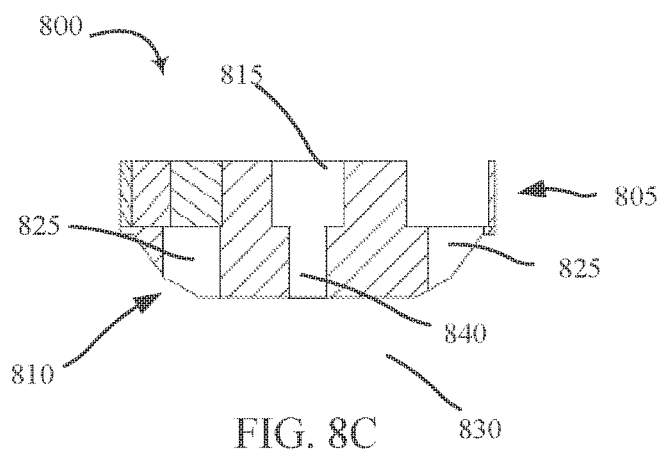
FIG. 8C is a diagram illustrating one example of a tool holder.

FIG. 8C shows an exemplary cross-section of the tool holder 800 along cross-section L-L. The cross-section shows the thru-holes 825 as well as the thru-hole 840 for accepting the bolt. As shown in FIG. 8C, the thru-hole 840 may include a counterbore 845. The counterbore 845 may prevent a head of the bolt from protruding beyond the top surface 820 of the tool holder 800. Countersinking the bolt may provide a safer riding condition for the cyclist and prevent the cyclist from striking or catching on the bolt.

The cross-section shows the tool holder 800 with a substantially cylindrical top portion and a dome-like bottom portion 810. The bottom portion 810 may fit within the confines of a steering tube whereas the upper portion 805 may sit atop the steering tube.

The tool holder 800 may comprise a metallic material, wooden material, and/or a polymer material. The material chosen should allow ease of manufacture and reduced cost. For different materials, the end geometry may alter to accommodate for these differences in materials. A polymeric material should withstand potential weather conditions. The polymeric material may be injection molded, printed using a 3-dimensional printer, or other known manufacture methods. Similarly, a metallic material may be cast, machined, or the like.

Figure 9:
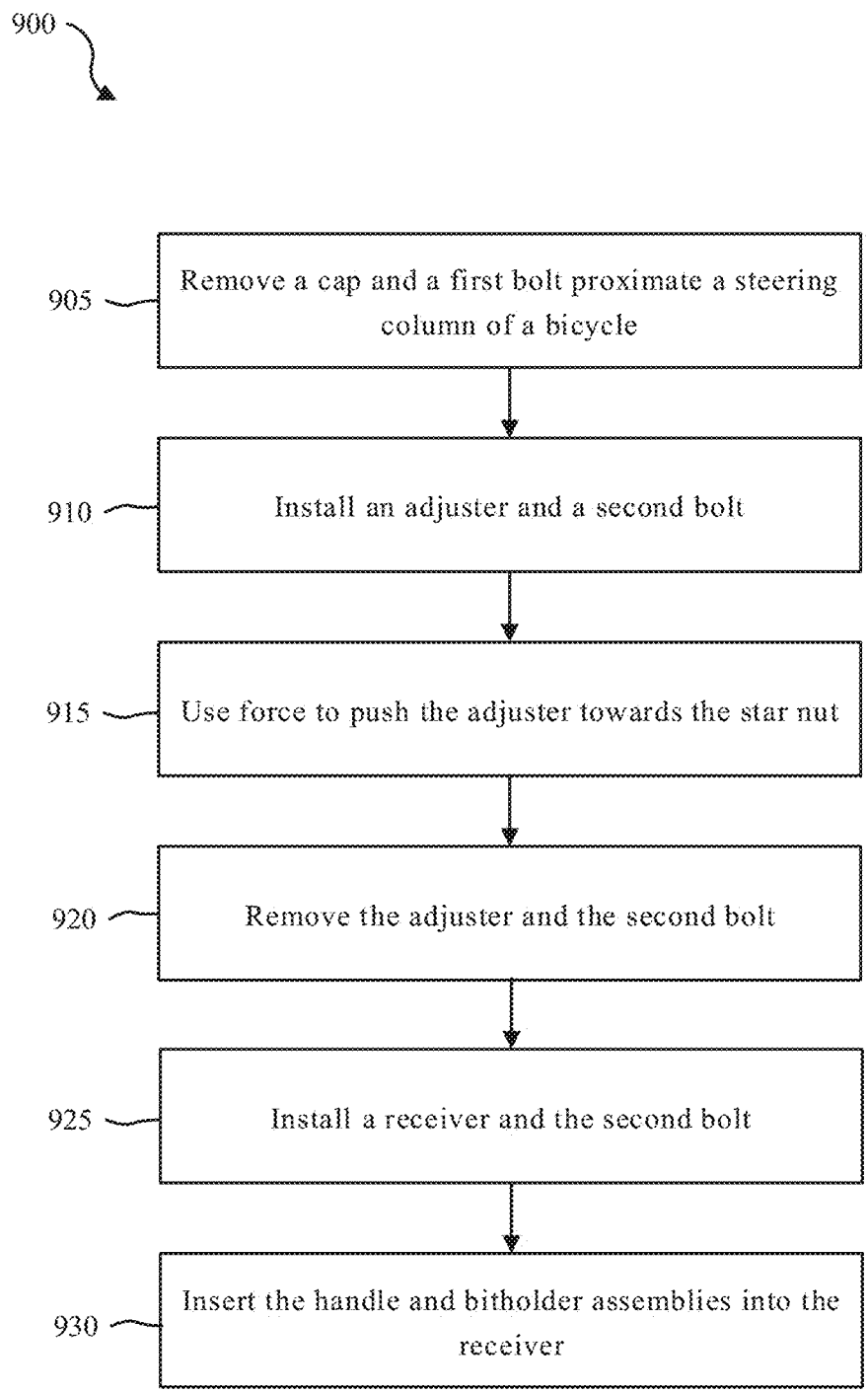
FIG. 9 is a flow diagram illustrating one embodiment of a method for installing an integrated cycling tool.

FIG. 9 is a flow diagram illustrating one embodiment of a method 900 for installing an integrated cycling tool (e.g. integrated cycling tool 200, FIG. 1) and/or a tool holder (e.g. tool holder 800, FIG. 8).

At block 905, the method 900 may include removing a cap and a first bolt proximate a steering tube of a bicycle. At block 910, the method 900 may include installing an adjuster (e.g. adjuster 255, FIG. 3B) and a second bolt. Installing the adjuster may include inserting the adjuster into the steering tube of the bicycle. The bolt may pass through the adjuster and attach to a star nut, which may be located inside the steering tube. At block 915, the method 900 may include using force to push the adjuster towards the star nut. This action may force the star nut down further into the steering tube towards a fork. The force may comprise bodily strength or a tool such as a hammer, mallet, or the like. At block 920, the method 900 may include removing the adjuster and the second bolt. At block 930, the method 900 may include installing a receiver and the second bolt. The second bolt may pass through a thru-hole proximate the receiver and clamp the receiver onto the steering tube by attaching the bolt to the star nut. At block 935, the method 900 may include inserting the handle and bit holder assemblies into the receiver.

Figure 10:
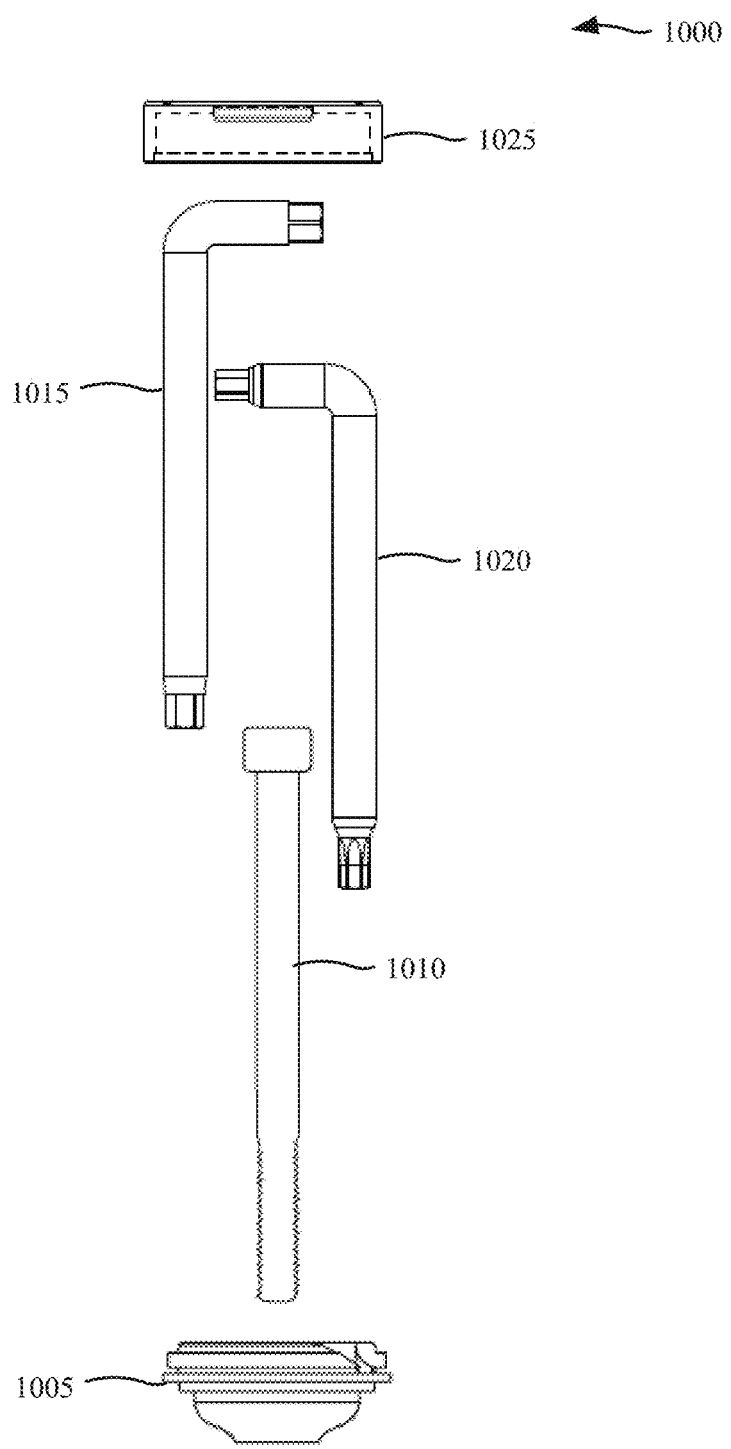
FIG. 10 is a diagram illustrating one example of an integrated cycling tool.

FIG. 10 illustrates another embodiment of an integrated cycling tool 1000 in an exploded configuration. The integrated cycling tool 1000 may comprise a receiver 1005, a fastener 1010, a first cycling tool, a second cycling tool 1020, and a cover 1025. The receiver 1005 may receive a portion of at least one of the cycling tools 1015, 1020. The receiver 1005 may also receive a portion of both cycling tools 1015, 1020. In some embodiments, the cover 1025 may releasably connect to the receiver 1005. The cycling tools 1015, 1020 may be customized to the receiver 1005 or, in alternative embodiments, the receiver 1005 may accept standard sized cycling tools.

Figure 11:
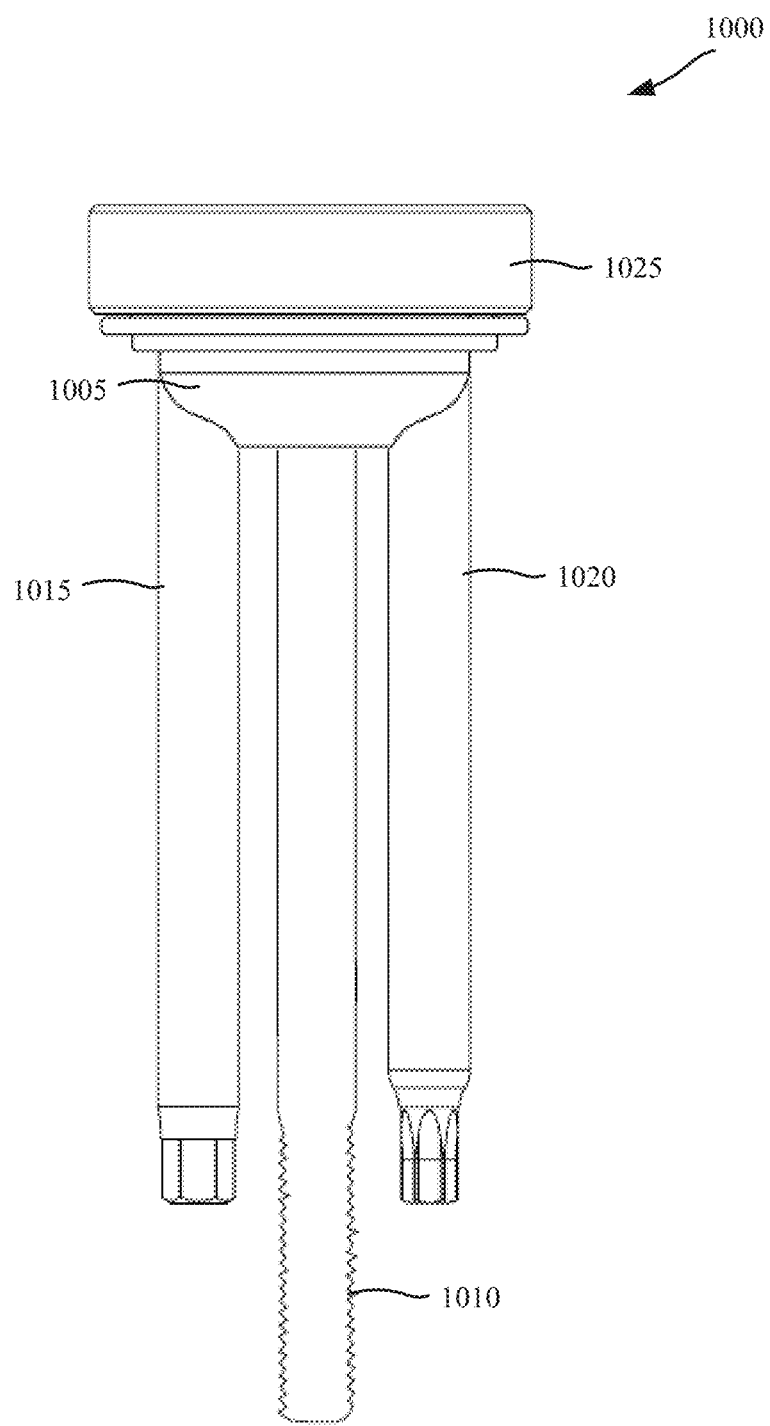
FIG. 11 is a diagram illustrating one example of an integrated cycling tool.

FIG. 11 is an assembled view of the integrated cycling tool 1000 of FIG. 10. The receiver 1005 is shown with both cycling tools 1015, 1020 assembled. In some embodiments, the receiver 1005 may form an orifice or aperture (not shown) which may accept a portion of at least one cycling tool 1015. The receiver 1005 may additionally and/or alternatively incorporate a non-circular orifice to receive a portion of one of the cycling tools 1015, 1020. For example, the orifice may be circular, slot-shaped, oval, rectangular, square, or the like. In some embodiments, the receiver 1005 may incorporate at least a first orifice for the first cycling tool 1015 and a second orifice for the second cycling tool 1020. The first orifice and second orifice may be nearly identical, such that either orifice could accept either cycling tool 1015, 1020. In other embodiments, each orifice may be specifically sized and shaped for a specific cycling tool 1015, 1020.

FIG. 11 also shows the receiver 1005 and the fastener 1010 assembled. A thru-hole may be formed in the receiver 1005 to accept the fastener 1010. The fastener 1010 may connect the receiver 1005 to a star nut (e.g. star nut 315, FIGS. 3A-3D) or a compression plug. The fastener 1010 may include a first portion that rests on a surface of the receiver 1005. The second portion of the fastener 1010 may pass through the thru-hole and into a hollow portion of a steering column (e.g. steering tube 145, FIG. 1) to connect to the star nut or compression plug located inside the steering column. Therefore, the fastener 1010 may connect the receiver 1005 to the steering column.

In another embodiment, the receiver 1005 may be threaded into the steering tube. For example, the steering tube may have one or more threads on an inner surface of the steering tube. The receiver 1005 may have a mating series of one or more threads. The receiver 1005 may then threadably engage the steering tube. In another embodiment, the receiver 1005 may be press-fit to the steering tube. For example, an outer diameter of the receiver 1005 may be slightly larger than an inner diameter of the steering tube. The difference in diameters could create an interference or friction interface between the receiver 1005 and inner surface of the steering tube when the receiver is forced into the steering tube. The receiver 1005 may then be held into place with the interference fit, or tight fit. In another embodiment, the receiver 1005 and the steering tube could be magnetically held together. For example, if the steering tube consists of ferromagnetic material, the receiver 1005 may incorporate one or more magnets which may then magnetically connect the receiver 1005 to the steering tube.

FIG. 11 also shows the cover 1025 releasably connected to the receiver 1005. For example, the cover 1025 may be threadably connected to the receiver 1005 such that the cover 1025 may be screwed on or off the receiver 1005. The threads may require at least one half turn of the cover 1025 to attach or detach the cover 1025 to the receiver 1005. In other embodiments, the cover 1025 may be magnetically connected to the receiver 1005. For example, the receiver 1005 and cover 1025 may each incorporate at least one magnetic portion such that the cover 1025 attaches to the receiver 1005. In some embodiments, one of the receiver 1005 or the cover 1025 may comprise a ferromagnetic material and the other may incorporate at least one magnet to connect to the ferromagnetic material. In other embodiments, the cover 1025 may releasably connect to a feature on the receiver 205, or vice versa. For example, Velcro may connect the cover 1025 and the receiver 1005; the cover 1025 may snap onto the receiver 1005; cover 1025 may clip to the receiver 1005; and the like.

Figure 12A:
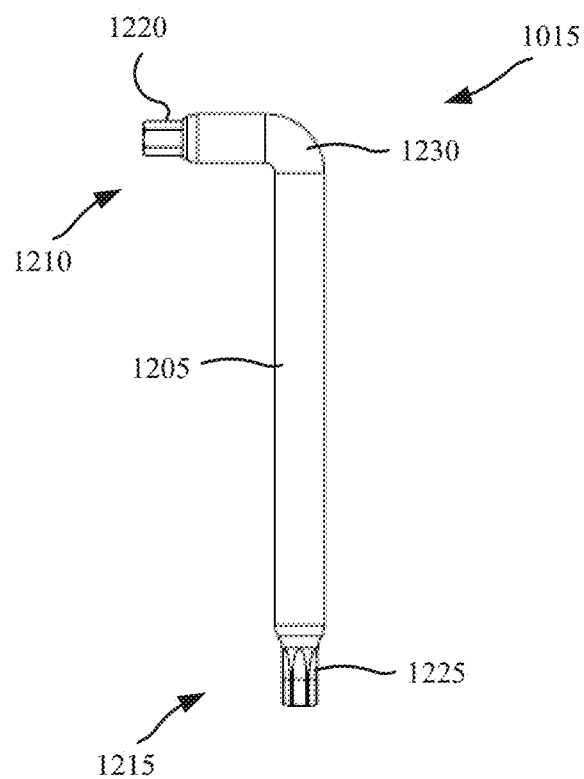
FIG. 12A is a diagram illustrating one example of a cycling tool.
Figure 12B:
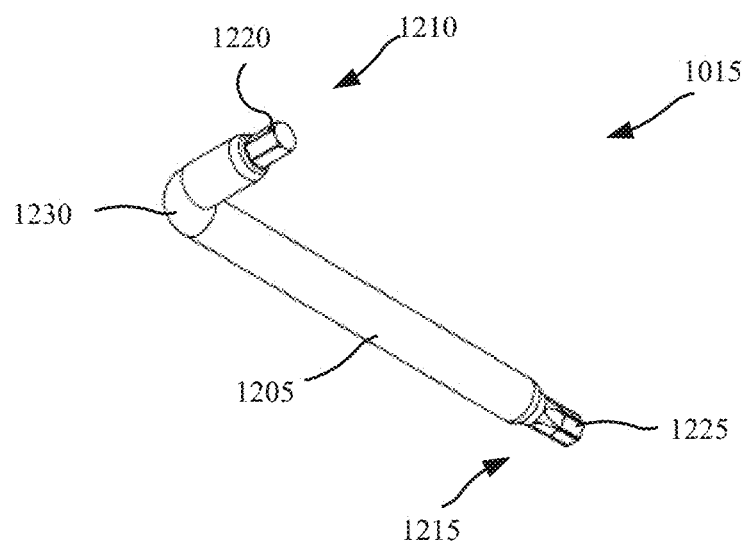
FIG. 12B is a diagram illustrating one example of a cycling tool.

FIG. 12A is a side view of the cycling tool 1015. FIG. 12B is an isometric view of the cycling tool 1015. The cycling tool 1015 may have an elongated portion 1205 connecting a first end 1210 with a second end 1215 of the cycling tool 1015. In some embodiments, an elbow 1230 or other joint feature may be incorporated into the elongated portion 1205 such that the cycling tool 1015 has an L-shaped appearance. In some embodiments, the first end 1210 and second end 1215 may each incorporate a tool feature. For example, in some embodiments, the first end 1210 may incorporate a multi-bit wrench 1220. The multi-bit wrench 1220 may include, but is not limited to, one of a rotor truing tool, T30, T25, T10, T5, a chain tool, a hex wrench sized as one of 1.5 mm, 2 mm, 2.5, 3 mm, 4 mm, 5 mm, 6 mm, 8 mm, 10 mm, a spoke wrench, a knife, a flat blade, a bottle opener, a Philips or flat head screwdriver, tire leavers, tire plugs, a box wrench, a pedal wrench, and a presta valve tool. Additionally, and/or alternatively, the second end 1215 of the cycling tool 1015 may incorporate a multi-bit wrench 1225. The multi-bit wrench 1225 may either be the same or different from the multi-bit wrench 1220 and may include at least one of the aforementioned tools. In some embodiments, the elongated portion 1205 may incorporate a tool and/or an opening to accept a tool bit or accept another cycling tool (e.g. cycling tool 1020).

Figure 13A:
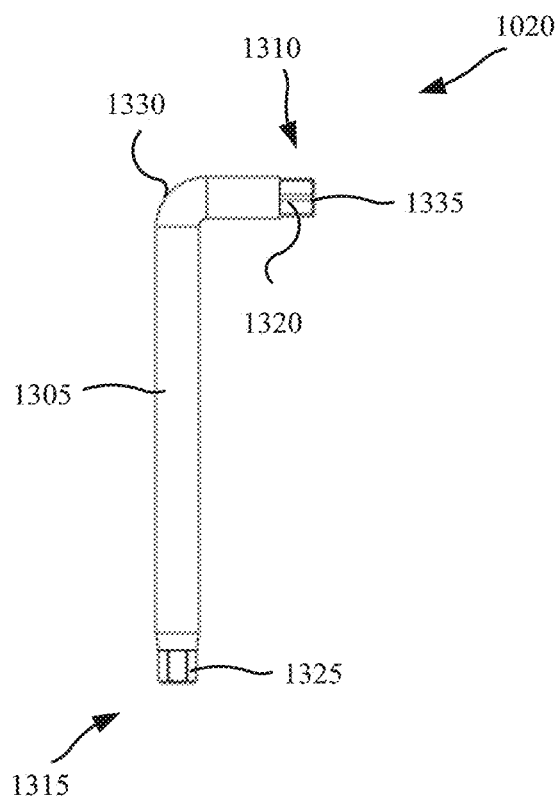
FIG. 13A is a diagram illustrating one example of a cycling tool.
Figure 13B:
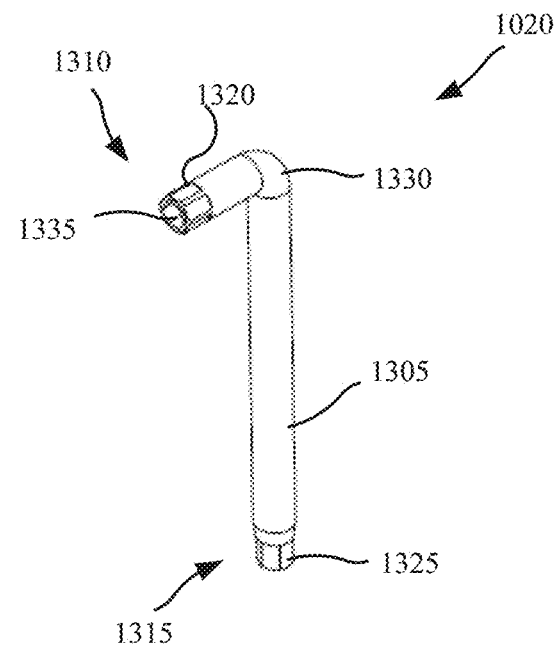
FIG. 13B is a diagram illustrating one example of a cycling tool.

FIG. 13A is a side view of the cycling tool 1020. FIG. 13B is an isometric view of the cycling tool 1020. The cycling tool 1020 may have an elongated portion 1305 connecting a first end 1310 with a second end 1315 of the cycling tool 1020. In some embodiments, an elbow 1330 or other joint feature may be incorporated into the elongated portion 1305 such that the cycling tool 1020 has an L-shaped appearance. In some embodiments, the first end 1310 and second end 1315 may each incorporate a tool feature. For example, in some embodiments, the first end 1310 may incorporate a multi-bit wrench 1320. The multi-bit wrench 1320 may include, but is not limited to, one of a rotor truing tool, T30, T25, T10, T5, a chain tool, a hex wrench sized as one of 1.5 mm, 2 mm, 2.5, 3 mm, 4 mm, 5 mm, 6 mm, 8 mm, 10 mm, a spoke wrench, a knife, a flat blade, a bottle opener, a Philips or flat head screwdriver, tire leavers, tire plugs, a box wrench, a pedal wrench, and a presta valve tool. Additionally, and/or alternatively, the second end 1315 of the cycling tool 1020 may incorporate a multi-bit wrench 1325. The multi-bit wrench 1325 either the same or different from the multi-bit wrench 1320 and may include at least one of the aforementioned tools. In some embodiments, the elongated portion 1305 may incorporate a tool and/or an opening to accept a tool bit or accept another cycling tool (e.g. cycling tool 1015).

Figure 14A:
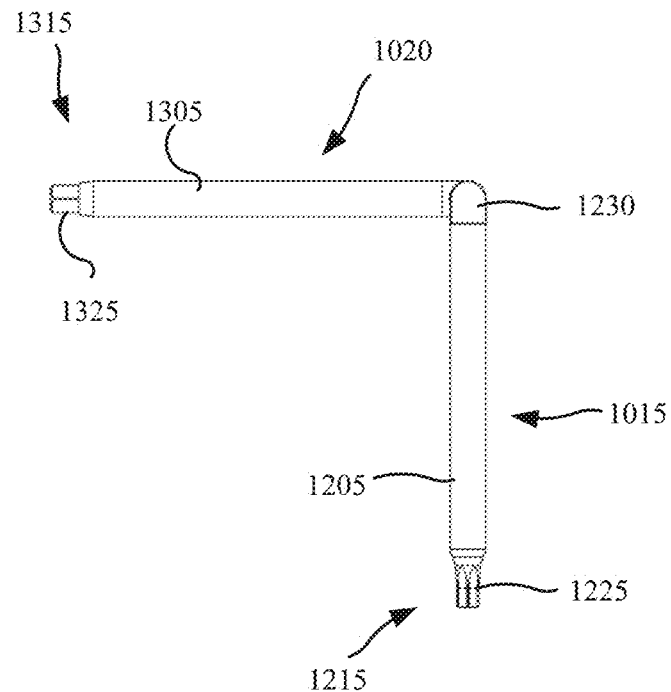
FIG. 14A is a diagram illustrating one example of two cycling tools connected together.
Figure 14B:
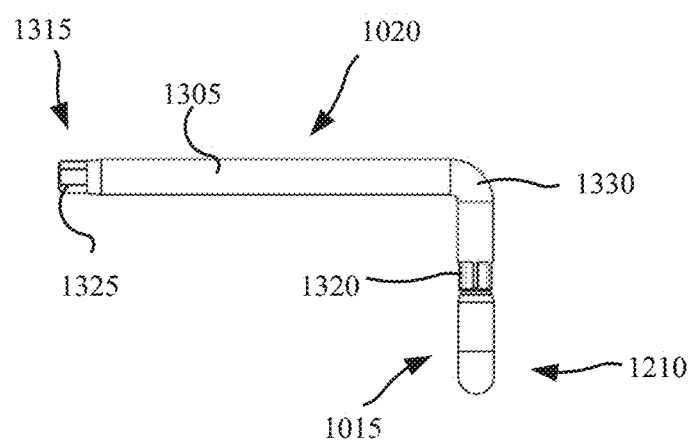
FIG. 14B is a diagram illustrating one example of two cycling tools connected together.

In some embodiments, as shown in FIGS. 14A and 14B, the at least two cycling tools 1015, 1020 may connect together. For example, with reference to FIG. 13B, the first end 1310 of the cycling tool 1020 may incorporate a recess 1335. The recess 1335 may be sized to accept either tool wrench 1220 or tool wrench 1225. For example, at least one tool wrench 1320 of the second cycling tool 1020 may be sized larger than at least one tool wrench 1220 of the first cycling tool 1015 such that the tool wrench 1320 forms a recess 1335 which may accept at least a portion of the tool wrench 1220 as shown in FIGS. 14A and 14B. The size and shape of the recess 1335 may depend upon the size and shape of the tool wrench it is accepting. For example, if the tool wrench 1220 is a 4 mm hex tool, the tool wrench 1320 may be at least a 6 mm hex wrench, or similarly sized tool, with the recess 1335 incorporated therein. The recess 1335 may be sized to accept the 4 mm hex tool. Similarly, if the tool wrench 1220 is a T25 Torx wrench, the tool wrench 1320 may be a T27 Torx wrench or larger with the recess 1335 formed within the tool wrench 1320. In that embodiment, the recess 1335 would be sized to accept a T25 Torx wrench. The two wrenches 1220, 1320 also may be different types. For example, the wrench 1220 may be a 4 mm hex wrench and the wrench 1320 may be a T27 or larger. The size of the wrenches 1220, 1320 and should be such that the recess 1335 may be formed in the second wrench 1320 and be able to accept the first wrench 1220.

Similarly, the second end 1315 may include a recess (not shown) which may be similarly designed to accept at least portion of the cycling tool 1015. In some embodiments, the first end 1310 or second end 1315 may incorporate a recess (not shown) which may fit tool bits stored within the cover (e.g. cover 1025, FIG. 10). In still further embodiments, tool bits may be stored at least partially within the steering column and may be fitted to at least one of the cycling tools 1015, 1020 to form a larger tool.

In some embodiments, bits may also be attached over or surrounding at least a portion of one of the cycling tools 1015, 1020. For example, if a tool wrench (e.g. tool wrench 1220, 1225, 1320, 1325) comprised a 5 mm or 6 mm bit, an 8 mm bit could fit over the 5 mm bit to create a larger bit when necessary. The larger bits may be stored in a cover (e.g. cover 1025), which the steering tube, or elsewhere. In further embodiments, a sleeve of bits could be housed in the receiver 1005. The sleeve of bits may extend the capabilities of the existing wrenches or enable the wrenches to hold the bits. In still further embodiments, the elongated portion 1205, 1305 of the cycling tools 1015, 1020 may contain one or more crevices which may store bits. In another embodiments, inserts may slide over the cycling tool 1015, 1015 which may increase a surface area of the elongated portions 1205, 1305 which maybe enable the cycling tools 1015, 1020 to tire levers, pliers, or other tools necessary for bicycle repair and/or upkeep.

FIG. 15A is a side view of the cover 1025. FIG. 15B is a bottom view of the cover 1025. FIG. 15C is an isometric view of the cover 1025. The cover 1025 may include a top side 1505 and a bottom side 1510. The top side 1505 may comprise a substantially planar surface 1515. In some embodiments, the top side 1505 may incorporate a design or other aesthetically appealing artistic rendition. In other embodiment, the top side 1505 may be a non-uniform surface. For example the top side 1505 may be rounded, oval, mountain shaped, or the like. In some embodiments, the top side 1505 may incorporate indicia such as a character or other artistic rendition of an object.

The bottom side 1510 may be substantially open. For example, as shown in FIG. 15C, the cover 1025 may form a substantially hollow portion 1535. The surface 1515 of the cover 1025 may be connected to a wall 1520 forming the substantially hollow portion 1535. The wall 1520 may comprise a predetermined thickness. In some embodiments, the wall 1520 may incorporate one or more threads 1525 on an inner surface 1530 of the wall 1520. The one or more threads 1525 may releasably connect the cover 1025 to the receiver 1005. In other embodiments, the wall 1520 and/or cover 1025 itself may incorporate one or more features to releasably connect the cover 1025 to the receiver 1005. For example, in some embodiments, the wall 1520 may include a lip or other feature to snap onto a receiving feature of the receiver 1005.

In some embodiments, the cover 1025 may include a compressible component 1540. The compressible component 1540 may consist of a compressible material. The compressible material may include, for example, a rubber, foam, polymer, or other ductile, flexible material. The compressible component 1540 may be located on a surface 1545 opposite the top side 1505 of the cover 1025. In some embodiments, the compressible component 1540 may be located substantially centrally within the surface 1545. In other embodiments, multiple compressible components 1540 may be incorporated on the surface 1545.

The compressible component 1540 may exert a force on at least one cycling tool 1015, 1020 when the cover 1025 is connected to the receiver 1005 and at least cycling tool 1015, 1020 is installed on the receiver 1005. For example, the compressible component 1540 may contact at least one cycling tool 1015, 1020 installed on the receiver 1005 when the cover 1025 is connected to the receiver 1005. The contact may cause a portion of the compressible component 1540 to compress. The compression of the compressible component 1540 may exert a force on at least one cycling tool 1015, 1020. The force may cause at least one cycling tool 1015, 1020 to be stably secure when the cover 1025 is coupled to the receiver 1005. This force may prevent rattling or other erroneous noises when the bicycle is in motion. In some embodiments, a friction force may be generated by the compression which may secure the cover 1025 to the receiver 1005.

In other embodiments, the receiver 1005 may incorporate one or more retention devices for the cycling tools 1015, 1020. For example, the cycling tools 1015, 1020 may comprise a ferromagnetic material and the receiver 1005 may incorporate one or more magnets that may magnetically connect the cycling tools 1015, 1020 to the receiver 1005. The receiver 1005 may incorporate a positive retention feature such that the cycling tools 1015, 1020 snap into place, are held by an interference fit, or are secured with a fastener during assembly.

Figure 16A:
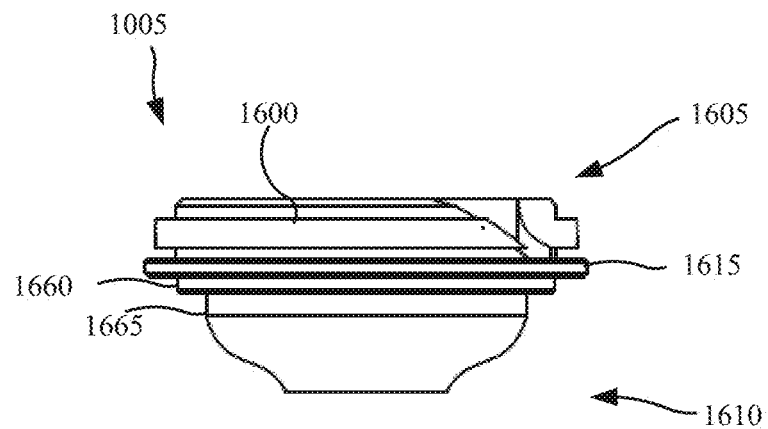
FIG. 16A is a diagram illustrating one example of a tool holder.
Figure 16B:
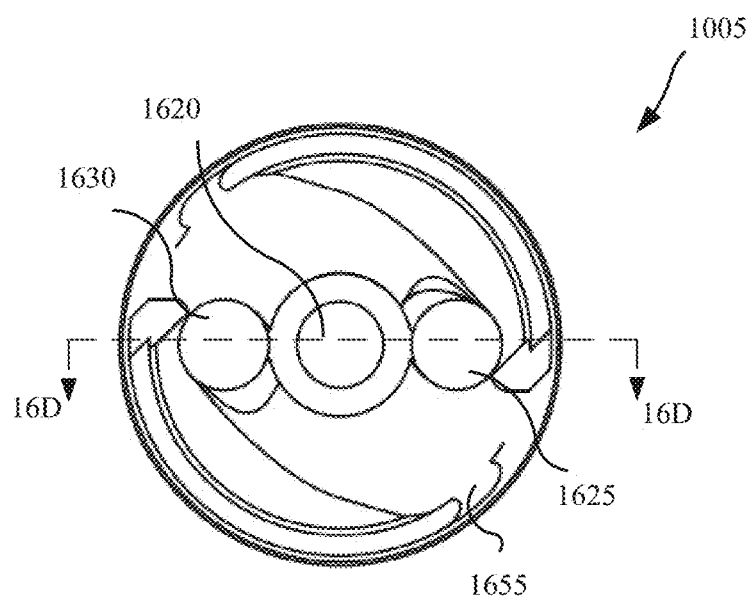
FIG. 16B is a diagram illustrating one example of a tool holder.
Figure 16C:
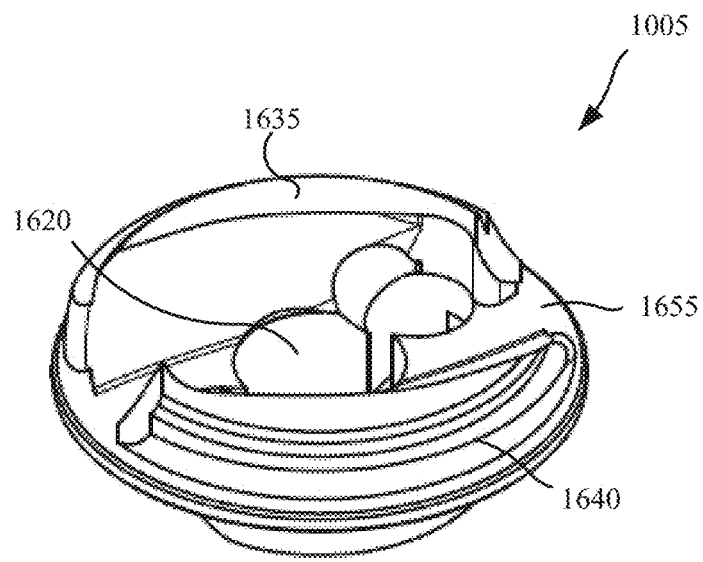
FIG. 16C is a diagram illustrating one example of a tool holder.
Figure 16D:
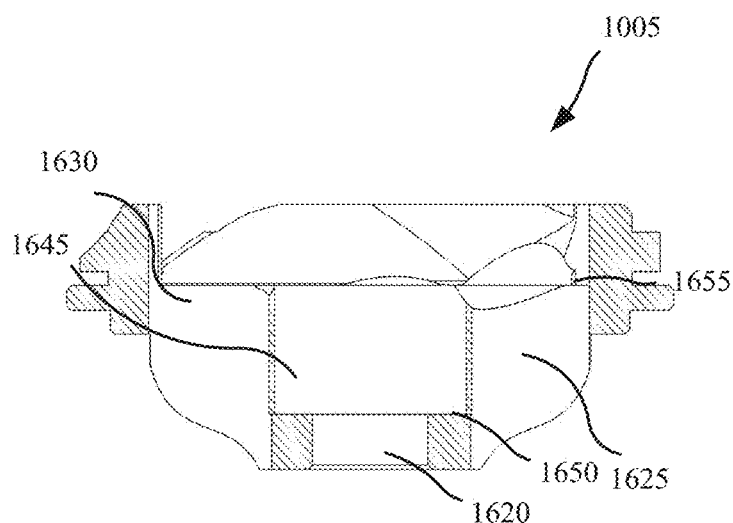
FIG. 16D is a diagram illustrating one example of a tool holder.

FIG. 16A is a side view of the receiver 1005. FIG. 16B is a top view of the receiver 1005. FIG. 16C is an isometric view of the receiver 1005. FIG. 16D is a cutaway view of the receiver 1005 along line 16D-16D in FIG. 16B. The receiver 1005 may be positioned partially within, fully within, or fully on an upper surface of the steering column. The receiver 1005 may include one or more features for connecting or coupling the receiver 1005 to the steering column as well as one or more features for retaining one or more cycling tools (e.g. cycling tools 1015, 1020).

As shown in FIG. 16A, a body 1600 of the receiver 1005 may include an upper portion 1605 and a lower portion 1610. In this embodiment, the upper portion 1605 may rest atop the steering column and the lower portion 1610 may rest within the steering column. A lip 1615 may separate the upper portion 1605 from the lower portion 1610. A location of the lip 1615 in the overall body 1600 of the receiver 1005 may change depending upon the cycling tool storage among other factors. The lip 1615 may have a diameter that is substantially the same as or larger than a diameter of the steering column. The lip 1615 may keep the upper portion 1605 of the receiver 1005 on top of the steering column. In some embodiments, the lip 1615 may have a feature such as a wing or an additional lip that may extend laterally downwards from the lip 1615 toward the lower portion 1610. This additional lip may further secure a location of the receiver 1005 on the upper portion of the steering column. In some embodiments, this additional lip may provide a clipping or clamping feature such that the receiver 1005 can connect to a mating feature on an outer edge of the steering column.

In another embodiment, a threaded collar may be pressed into or fit over the steer tube. The threaded collar may include one or more threads which may mate with a series of threads proximate the receiver 1005. The receiver 1005 may then thread onto and/or into the collar threads.

In some embodiments, the lower portion 1610 of the receiver 1005 may substantially center the receiver 1005 on the steering column. The lower portion 1610 may also incorporate several features to mate with different sized steering columns. For example, steering columns may not have a standard sized inner diameter. Therefore, the lower portion 1610 may incorporate a first centering surface 1660 and a second centering surface 1665. The first centering surface 1660 may center the receiver 1005 in larger sized steering columns. The second centering surface 1665 may center the receiver 1005 in smaller hollows or cavities formed with the steering column. Additionally, as shown in FIG. 16A, the second centering surface 1665 may incorporate a tapered portion to allow for mating with various inner diameters of the steering column.

As shown in FIG. 16B, the receiver 1005 may form one or more cavities, apertures, recesses, or thru-holes in the body 1600. A first aperture 1620 may accept a portion of a fastener (e.g. fastener 1010) which may connect or couple the receiver 1005 to the steering column. The body 1600 may additionally form at least one aperture 1625 to accept at least a portion of at least one cycling tool. In the embodiment shown, the body 1600 forms two apertures 1625, 1630 to accept at least two cycling tools. In alternative embodiments, the body 1600 may form at least one aperture and/or more than two apertures. In the embodiment shown, the apertures 1625, 1630 are substantially cylindrical. In other embodiments, the apertures 1625, 1630 may comprise other shapes and/or outlines. For example the apertures 1625, 1630 may comprise square, hexagonal, rectangular, or other shapes to accept various cycling tools.

As shown in FIG. 16C, the receiver 1005 may incorporate one or more cover retention components 1635, 1640. The cover retention components 1635, 1640 may incorporate a series of threads to mate with a series of threads proximate the cover 1025. In other embodiments, the cover retention components 1635, 1640 may incorporate a snap feature, Velcro feature, or other retention device which may mate with a complimentary component proximate the cover 1025.

As shown in FIG. 16D, the aperture 1620 may incorporate a counterbore 1645. The counterbore 1645 and resulting shoulder 1650 may enable the fastener 1010 to rest upon the shoulder 1650 while the counterbore 1645 may allow a head of the fastener 1010 to rest below an upper surface 1655 of the body 1600 of the receiver 1005.

Figure 17A:
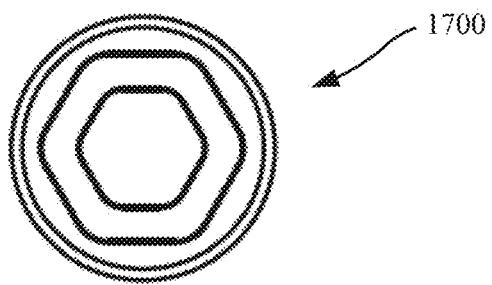
FIG. 17A is a diagram illustrating an example of an installation device.
Figure 17B:
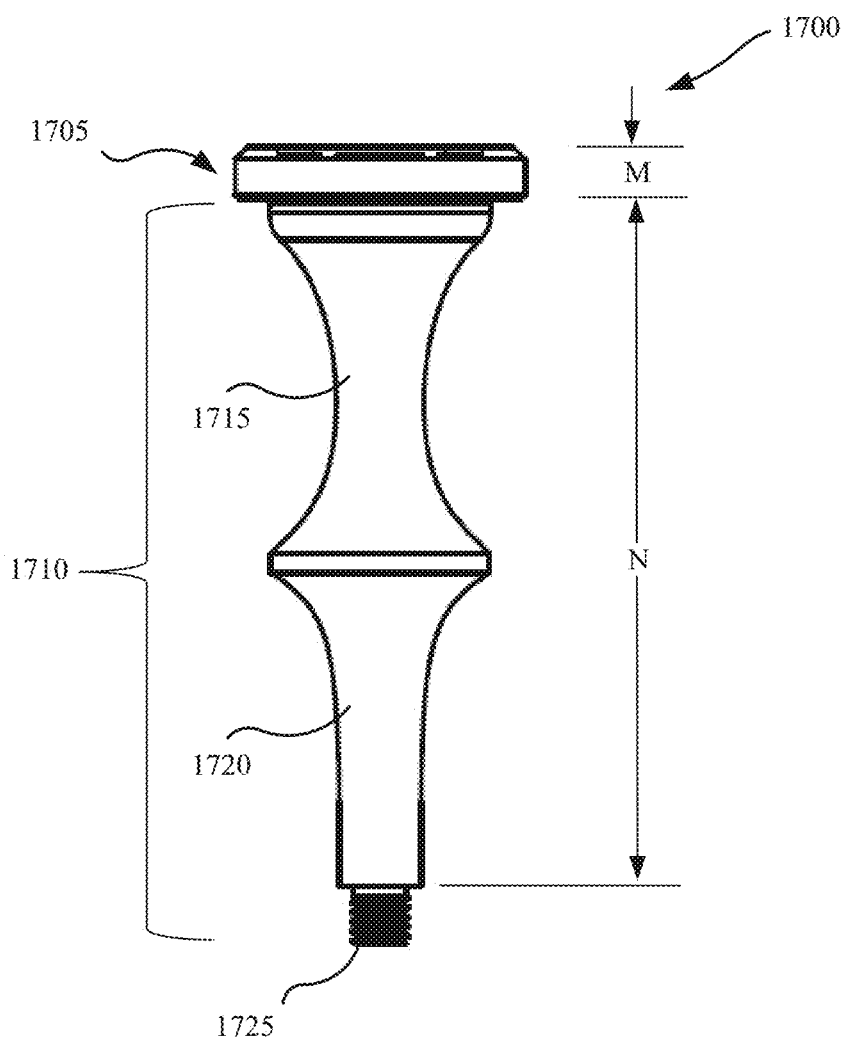
FIG. 17B is a diagram illustrating an example of an installation device.

FIG. 17A is a top view of an adjuster 1700. FIG. 17B is a side view of the adjuster 1700. The adjuster 1700 may be similar to the adjuster 355 described with reference to FIGS. 3A-C. For example, the adjuster 1700 may comprise a top portion 1705 and a bottom portion 1710. The bottom portion 1710 of the adjuster 1700 may incorporate a non-linear surface. For example, the bottom portion 1705 may have a first section 1715 and a second section 1720. The first section 1715 may be concave. The concave shape of the first section 1715 may provide for an easier gripping surface when installing the integrated cycling tool. The second section 1720 may taper from the first section 1715 towards a threaded portion 1725. The threaded portion 1725 may enable the adjuster 1700 to connect directly to the star nut (e.g. star nut 315, FIGS. 3A-3D) for purposes of adjusting the star nut to a predetermined distance below a top surface of the steering column.

The top portion 1705 of the adjuster 1700 may be any shape and may be sized larger than an outer diameter of the steering column. In some embodiments, the top portion 1705 may be cylindrical for ease of manufacture, but may additionally comprise any shape that exceeds the outer diameter of the steering column. A height M of the top portion 1705 may be any acceptable height to provide structural stability. In this embodiment, the height M may be approximately ¼ inch. In other embodiments, the height M may be larger or smaller than ¼ inch. A height N of the bottom portion 1710 may be specifically sized similarly to the height of integrated cycling tool 1000. This may allow the adjuster 1700 to move the star nut towards the suspension fork and create a hollow portion for the integrated cycling tool 1000 to fit within the steering column. In this embodiment, the height N may be approximately three inches. In some embodiments, the height N may be larger or smaller than three inches. For example, the height N may range from ½ inch to 6 inches or greater.

In some embodiments, the adjuster 1700 may comprise a cylindrical shape which may remain connected to the star nut or compression nut. In some embodiments, the adjuster 1800 may house one or more cycling tools. For example, the adjuster 1800 may comprise one or more openings, one or more hollow portions, or other caveats for housing one or more cycling tools. The adjuster 1700 may comprise, for example, a bit driver, a punch, or a bottle opener. In some embodiments, the threaded portion 1725 may also be a punch.

Figure 18:
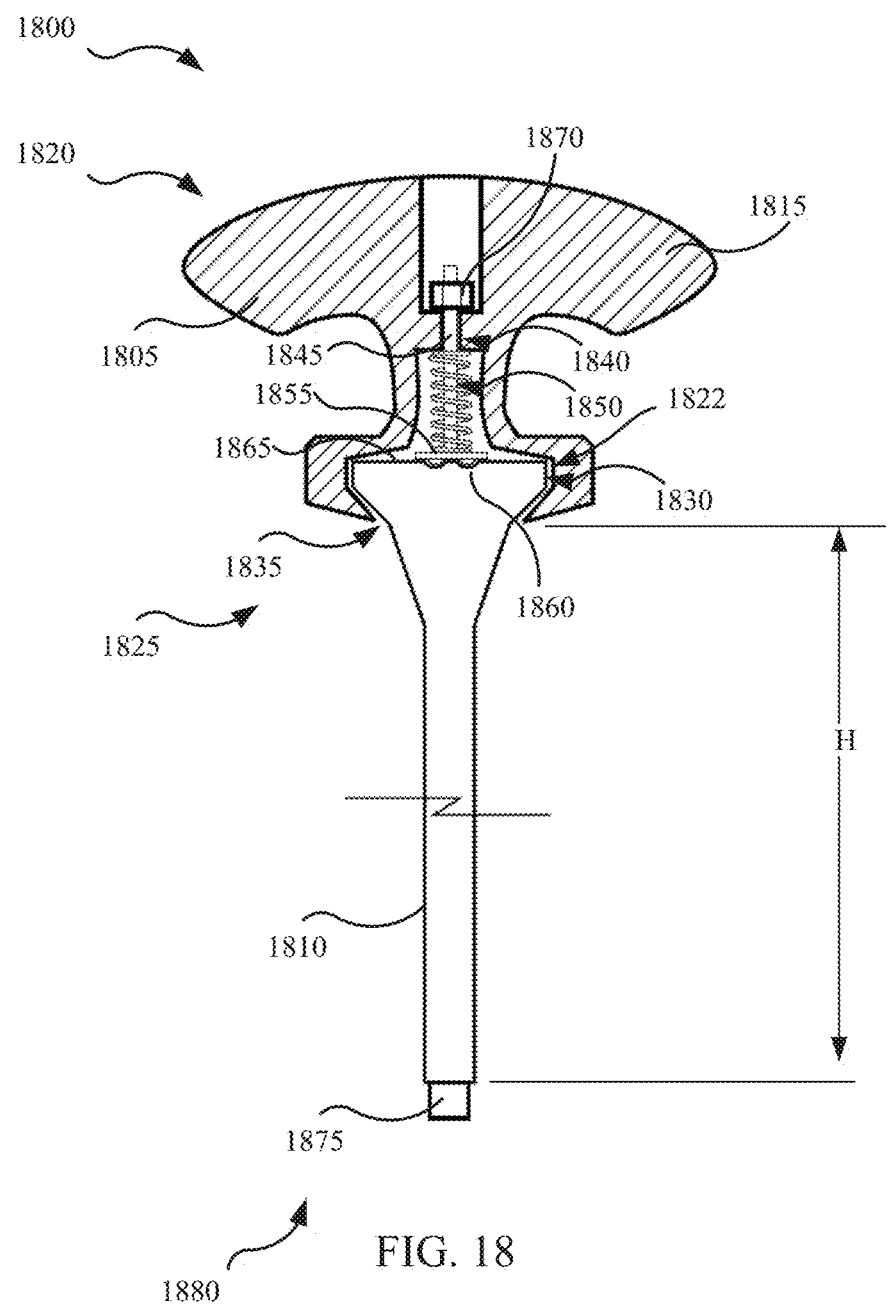
FIG. 18 is a diagram illustrating another example installation device.

FIG. 18 is a cross-sectional view of another exemplary adjuster 1800. The adjuster 1800 may be a type of wrench. In some embodiments, the adjuster 1800 may be a type of torque wrench. The adjuster 1800 may include a handle portion 1805 and a shaft portion 1810. The handle portion 1805 may include a handle 1815 on a first end 1820 for a user to grip the adjuster 1800. The handle portion 1805 may connect to the shaft portion 1810 at a second end 1825 opposite the first end 1820. In some embodiments, the second end 1825 may include a recess 1822 to accept at least a portion of the shaft portion 1810. The recess 1822 may comprise a trapezoidal or other geometric cross section such that the handle portion 1805 and shaft portion 1810 form an inseparable assembly. For example, an outer diameter 1830 of the shaft portion 1810 may be larger than an opening 1835 of the recess 1822 such that at least a portion of the shaft portion 1810 is coupled to the handle portion 1805.

The handle portion 1805 may include an aperture 1840 which may accept at least a portion of an elongated member 1845. The elongated member 1845 may thread through a tension member 1850 and be coupled to a base 1855. The base 1855 may rest on a seat 1860 proximate an upper surface 1865 of the shaft portion 1810. A fastener 1870 may connect to the elongated member 1845 and couple the elongated member 1845 and tension member 1850 to the handle portion 1805. The tension member 1850 may exert a force on the base 1855 and, by proxy, the upper surface 1865 of the shaft portion 1810. The tension member 1850 may additionally and/or alternatively exert a force on the handle portion 1805.

The shaft portion 1810 may fit to a compression plug. For example, a bit 1875 may be proximate an end 1880 of the shaft portion 1810 opposite the handle portion 1805 of the adjuster 1800. The bit 1875 may removably connect to a fastener proximate the compression plug. The compression plug may be located within a steering column of a bicycle. In some embodiments, a length H of the shaft portion 1810 may determine a distance at which to play the compression plug. The length H may change depending upon a size of the bicycle tool to be placed within the steering column. For example, the height H may be specifically sized similarly to the height of integrated cycling tool 1000. This may allow the adjuster 1800 to move the compression plug towards the suspension fork and create a hollow portion for the integrated cycling tool 1000 to fit within the steering column. In this embodiment, the height H may be approximately three inches. In some embodiments, the height N may be larger or smaller than three inches. For example, the height N may range from ½ inch to 6 inches or greater.

In some embodiments, the handle portion 1805 and the shaft portion 1810 may separate and/or break away when a predetermined torque value is satisfied. For example, as a user rotates the handle portion 1810 to tighten the compression plug, the shaft portion 1810 may rotate as well. When the compression plug satisfies a predetermined torque value, the handle portion 1810 and shaft portion 1810 disconnect, thereby preventing a user from over tightening the compression plug.

In other embodiments, the adjuster 1800 may comprise a cylindrical shape which may remain connected to the star nut or compression nut. In some embodiments, the adjuster 1800 may house one or more cycling tools. For example, the adjuster 1800 may comprise one or more openings, one or more hollow portions, or other caveats for housing one or more cycling tools. The adjuster 1800 may comprise, for example, a bit driver, a punch, or a bottle opener. In some embodiments, the bit 1875 may also be a punch.

Figure 19:
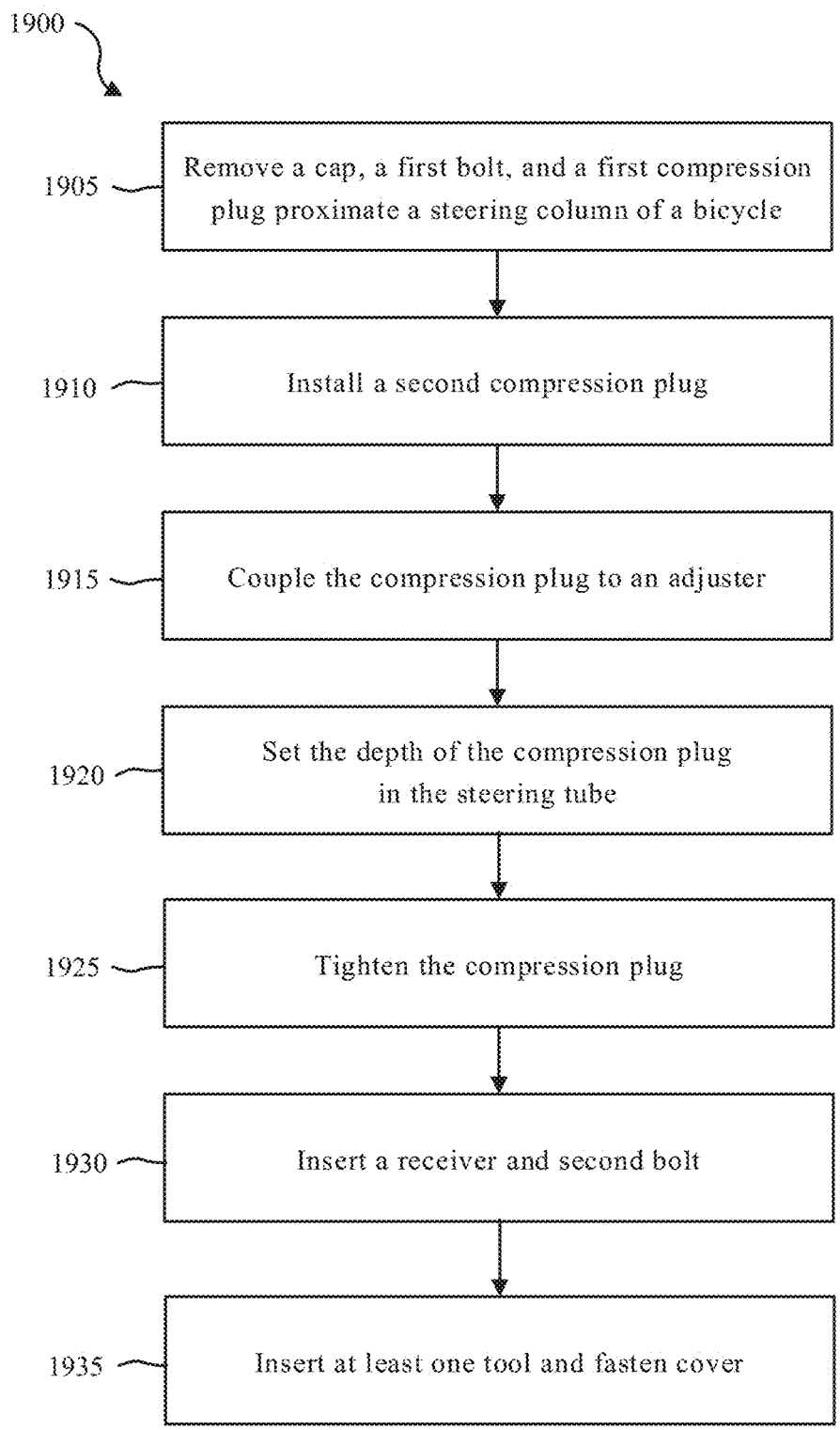
FIG. 19 is a flow diagram illustrating one embodiment of a method for installing an integrated cycling tool.

FIG. 19 is a flow diagram illustrating one embodiment of a method 1900 for installing an integrated cycling tool (e.g. integrated cycling tool 200, FIG. 1; 1000, FIG. 10) using an adjuster (e.g. adjuster 1800, FIG. 18).

At block 1905, the method 1900 may include removing a cap, a first bolt, and a compression plug proximate a steering tube of a bicycle. For example, a steering tube may incorporate a compression plug which may provide tension for proper bearing placement of the steering tube. The compression plug may expand when compressed, thus providing a force on an inner wall of the steering column. In some embodiments, the compression plug may incorporate a lip or other feature which may rest upon an upper surface of the steering column.

At block 1910, the method 1900 may include installing a second compression plug into the steering tube. The second compression plug may fit within the hollow of the steering column. At block 1915, the method 1900 may include coupling the compression plug to an adjuster.

At block 1920, the method 1900 may include setting a depth of the compression plug in the steering tube. For example, the compression plug may sit at a pre-determined distance below the upper surface of the steering column. This pre-determined distance may form a cavity, or distance between an upper surface of the steering column and the compression plug within the steering column. The hollow may accept an integrated bicycle tool. The depth of the compression plug within the steering relative to the upper surface may be set by the adjuster (e.g. adjuster 1800).

Once the compression plug is at the correct position, at block 1925, the method 1900 may include tightening the compression plug. For example, the adjuster may include a handle, which, when turned, may tighten a fastener proximate the compression plug. This may cause the compression plug to expand and exert a retention force on an inner surface of the steering tube. The adjuster may be, for example, a torque wrench, which, when a proper torque is reached, may prevent further tightening of the fastener. Once the compression plug is properly fastened, the adjuster may be removed from the compression plug.

At block 1930, the method 1900 may include installing a receiver and second bolt. For example, the receiver may sit within a portion of the steering column and the second bolt may fasten the receiver to the compression plug. This may provide positive retention of the receiver to the steering column. At block 1935, the method 1900 may include inserting at least one tool into the receiver and fastening a cover to the receiver. In some embodiments, the receiver may accept more than one tool. In some embodiments, the cover may incorporate one or more additional and/or alternative tools.

While the technology of the present application is described with respect bicycles, the technology disclosed herein may be applicable to other types of motion devices, and even more generally to any application where a hollow portion is available to store a tool. Moreover, the technology disclosed herein will be described with reference to certain exemplary embodiments. The word "exemplary" is used herein to mean "serving as an example, instance, or illustration." Any embodiment described herein as "exemplary" is not necessarily to be construed as preferred or advantageous over other embodiments absent a specific indication that such an embodiment is preferred or advantageous over other embodiments. Moreover, in certain instances only a single "exemplary" embodiment is provided. A single example is not necessarily to be construed as the only embodiment. The detailed description includes specific details for the purpose of providing a thorough understanding of the technology of the present patent application. However, on reading the disclosure, it will be apparent to those skilled in the art that the technology of the present patent application may be practiced with or without these specific details. In some descriptions herein, generally understood structures and devices may be shown in block diagrams to aid in understanding the technology of the present patent application without obscuring the technology herein. In certain instances and examples herein, the term "coupled" or "in communication with" means connected using either a direct link or indirect data link as is generally understood in the art.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A cycling tool, comprising:
   at least one tool operable to adjust a component of a bicycle; and
   a receiver having a first portion sized to fit within a steering column of a bicycle, the receiver comprising at least one cavity formed in an upward facing surface of the receiver and sized to receive at least a portion of the at least one tool, the receiver retaining at least a portion of the at least one tool within the steering column to store the at least one tool;
   wherein the at least one tool comprises a tool holder comprising at least two tools.

2. The cycling tool of claim 1, further comprising:
   the at least one cavity includes at least two cavities formed in an upward facing surface of the receiver
   wherein the at least one tool includes at least two tools, the at least two tools being separately received in the at least two orifices.

3. The cycling tool of claim 1, wherein the at least two tools are releasably connected to each other to form a combination tool.

4. The cycling tool of claim 1, further comprising:
   an elongated fastener operable to releasably connect the receiver to the steering column;
   a thru-hole proximate the receiver, the thru-hole arranged to receive the elongated fastener.

5. The cycling tool of claim 1, wherein the receiver further comprises a second portion sized to abut against a top end surface of the steering column.

6. A cycling tool, comprising:
   at least one tool operable to adjust a component of a bicycle;
   a receiver having a first portion sized to fit within a steering column of a bicycle, the receiver comprising at least one cavity formed in an upward facing surface of the receiver and sized to receive at least a portion of the at least one tool, the receiver retaining at least a portion of the at least one tool within the steering column to store the at least one tool; and
   a cover releasably connected to the receiver;
   wherein the cover is positioned atop the steering column.

7. A cycling tool, comprising:
   at least one tool; and
   a tool holder, comprising:
      a first portion sized to be positioned within a steering column of a bicycle;
      a second portion sized to sit atop a top end of the steering column;
      at least one slot formed within the tool holder to receive a portion of the at least one tool to support the at least one tool within the steering column, the at least one slot comprising a thru-hole;
   wherein the tool holder is adapted to couple the top end of the steering column to a portion of the steering column below the top end;
   wherein the at least one tool comprises a set of tools.

8. The cycling tool of claim 7, further comprising:
   a fastener;
   a thru-hole formed within the tool holder to receive the fastener.

9. The cycling tool of claim 7, further comprising:
   a cover releasably connected to the tool holder.

10. The cycling tool of claim 9, further comprising:
    at least one magnet connected to the tool holder, the at least one magnet releasably connecting the at least one tool to the tool holder.

11. The cycling tool of claim 9, wherein the cover applies a force to secure the at least one tool in the tool holder when the cover is connected to the tool holder.

12. The cycling tool of claim 9, wherein the cover is threadably connected to the tool holder.

13. The cycling tool of claim 7, wherein the at least one tool includes first and second L-shaped tools, the first L-shaped tool including a tool bit sized to receive a portion of the second L-shaped tool to releasably connect the first and second L-shaped tools to each other.

14. The cycling tool of claim 7, wherein the set of tools are disposed in a body that integrates with the tool holder.

* * * * *